(12) United States Patent
Wu

(10) Patent No.: US 10,372,512 B2
(45) Date of Patent: Aug. 6, 2019

(54) METHOD AND APPARATUS FOR AUTOMATIC PROCESSING OF SERVICE REQUESTS ON AN ELECTRONIC DEVICE

(71) Applicant: Xiaoyun Wu, Palo Alto, CA (US)

(72) Inventor: Xiaoyun Wu, Palo Alto, CA (US)

(73) Assignee: Deepassist Inc., Grand Cayman (KY)

( * ) Notice: Subject to any disclaimer, the term of this patent is extended or adjusted under 35 U.S.C. 154(b) by 197 days.

(21) Appl. No.: 15/397,728

(22) Filed: Jan. 4, 2017

(65) Prior Publication Data

US 2018/0095807 A1    Apr. 5, 2018

(30) Foreign Application Priority Data

Sep. 30, 2016 (CN) .......................... 2016 1 08776147

(51) Int. Cl.
| | |
|---|---|
| *G06F 3/00* | (2006.01) |
| *G06F 9/44* | (2018.01) |
| *G06F 9/46* | (2006.01) |
| *G06F 13/00* | (2006.01) |
| *G06F 9/54* | (2006.01) |
| *G06F 16/903* | (2019.01) |
| *G06F 17/27* | (2006.01) |

(Continued)

(52) U.S. Cl.
CPC .......... *G06F 9/542* (2013.01); *G06F 9/45512* (2013.01); *G06F 16/90344* (2019.01); *G06F 17/2705* (2013.01); *H04L 67/42* (2013.01); *H04M 1/72522* (2013.01); *G06F 3/04883* (2013.01); *H04L 67/06* (2013.01); *H04L 67/2842* (2013.01)

(58) Field of Classification Search
CPC ....................................................... G06F 9/542
USPC ............................................................ 719/318
See application file for complete search history.

(56) References Cited

U.S. PATENT DOCUMENTS

| | | | |
|---|---|---|---|
| 9,548,050 B2 | | 1/2017 | Gruber et al. |
| 2003/0078779 A1 | | 4/2003 | Desai et al. |

(Continued)

FOREIGN PATENT DOCUMENTS

| | | |
|---|---|---|
| CN | 103179220 A | 6/2013 |
| CN | 104375836 A | 2/2015 |
| CN | 104780209 A | 7/2015 |

OTHER PUBLICATIONS

Beijing Qidian Intelligent Information Technology Co., Ltd., First Office Action, CN2015210161950.7, dated Aug. 1, 2017, 47 pgs.

(Continued)

*Primary Examiner* — Timothy A Mudrick
(74) *Attorney, Agent, or Firm* — Morgan, Lewis & Bockius LLP

(57) ABSTRACT

Embodiments of the present application provides methods and apparatus capable of recording operation/display events on a mobile device used to fulfill a service request. A recorded sequence operation/display events is used to build a script file, which is associated with the service request. When the same or similar service request is received again, the script file associated with the service request is retrieved and the mobile device automatically brings up a series of operation/display events according to the script file so that a user of the mobile device does not need to manually navigate through the sequence of operation/display events again in order to fulfill the service request.

20 Claims, 17 Drawing Sheets

(51) Int. Cl.
*H04L 29/06* (2006.01)
*H04M 1/725* (2006.01)
*G06F 9/455* (2018.01)
G06F 3/0488 (2013.01)
H04L 29/08 (2006.01)

(56) References Cited

U.S. PATENT DOCUMENTS

2013/0219333 A1\* 8/2013 Palwe ............... H04M 1/72522
 715/810
2016/0142859 A1 5/2016 Molinet et al.

OTHER PUBLICATIONS

Wu, Notice of Allowance, dated Aug. 1, 2018, 9 pgs.

\* cited by examiner

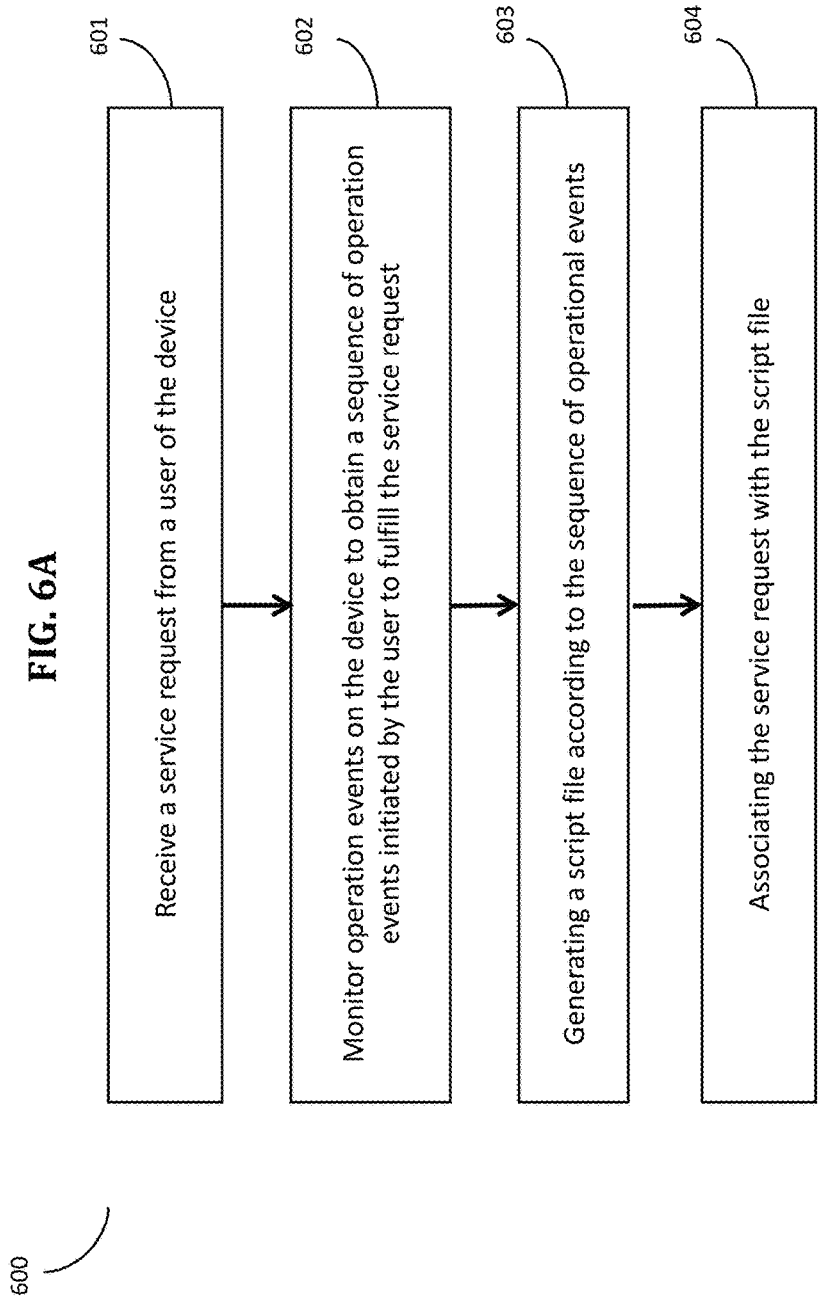

METHOD AND APPARATUS FOR AUTOMATIC PROCESSING OF SERVICE REQUESTS ON AN ELECTRONIC DEVICE

CROSS REFERENCE TO RELATED APPLICATIONS

The present application claims the benefit of priority under the Paris Convention to Chinese Patent Application No. 2016108776147, filed Sep. 30, 2016.

BACKGROUND

Field of the Invention

The present application is related to the field of computer technology, and more specifically to the method and apparatus for automatic processing of service requests on an electronic device.

Description of the Related Art

With the widespread use of electronic devices such as smart phones, networks and other emerging technologies, more and more software applications (also called "Apps") are developed to meet various needs of the users, such as applications for instant messaging, calling taxis, listening to music, watching videos, or browsing the Internet, etc. . . . .

Typically, for a particular service need, a user of a smartphone would manually click a corresponding application icon to open an application, and then operate within the application step by step to achieving the desired goal for the particular service need. With a conventional smartphone, the second time the user has the same service need, he would need to repeat the same step by step operations again to achieve the same or similar desired goal.

SUMMARY

Embodiments of the present application provide methods and apparatus for processing service requests.

In certain embodiments, a method of processing a service request comprises receiving a service request, recording the operation/display events to obtain a sequence of operation/display events required to fulfill the service request; generating a script file according to the sequence of operation/display events; associating the service request with the script file.

In certain embodiments, a method is performed by a computer system in communication with a mobile device via a packet-based network. The method comprises: receiving from the packet-based network information about a first service request and a sequence of operation/display events performed on the mobile device to fulfill the first service request; extracting a request template from the first service request; building a script file associated with the request template based on the sequence of operation/display events; and storing the script file and the associated request template in a data store. The method further comprises: receiving a second service request from the mobile device via the packet based network; in response to the second service request being similar to the request template, extracting variable information from the second service request and retrieving the script file associated with the request template from the data store; and transmitting the script file together with the request template and the variable information to the mobile device via the packet-based network.

In certain embodiments, a method for processing a service request performed by a server coupled to a client (e.g., a mobile device) via a packet-based network comprises: listening for the operation/display events of the client in response to a request from the client, and recording the monitored operation/display events to obtain a sequence of operation/display events used by the client to fulfill a service request; generating a script file according to the sequence of operation/display events, and associating the script file with the service request.

In certain embodiments, a method for processing a service request performed by a client comprises: receiving a service request via user input on an assist application; requesting a server for a script file associated with the service request; if a script file associated with the service request is not obtained, obtaining user permission to record operation/display events; in response to obtaining the user permission, recording operation/display events as the user navigates through a series of operation/display events on one or more applications to fulfill the service request; and sending the service request and an operation/display event sequence associated with the service event to the server.

In certain embodiments, an apparatus for processing a service request is provided. The apparatus comprises: a first receiving module for obtaining a service request; a recording module for recording the operation/display events on one or more applications to obtain a sequence of operation/display events required to fulfill the service request; a generating module for generating a script file; an association module for associating the service request with the script file.

In certain embodiments, an apparatus for processing a service request is provided. The device comprising: a monitoring & recording module for listening to the operation/display events of the client according to a recording request sent by the client, and recording the monitored operation/display events to obtain a sequence of operation/display events required to realize the service request; a generating module for generating a script file according to the operational event sequence; and an association module for associating the script file with the service request.

In certain embodiments, an apparatus for processing a service request is provided. The apparatus comprising: a first transmitting module for requesting the server terminal to obtain a script file associated with the service request in response to a service request inputted through the assist application; a recording module for (if no script file associated with the service request is given by the previous module) recording the operation/display events of the one or more application in response to the recording instruction triggered by the assist application to obtain a sequence of operation/display events necessary for realizing the service request; a second transmitting module for sending the operational event sequence associated with the service requests to the server.

In certain embodiments, a mobile device includes a processor, memory, and an input/output module, the memory storing therein a software stack, the software stack including at least one service application, an assist application (i.e., the AP), and an operating system. The operating system includes services, which, when called by the processor running the assist application to enter a recording mode, causes the processor to perform a method of building a script file. The method comprises: capturing the user inputs and the program displays on the input/output module as a user of the mobile device navigates at least one service application to fulfill a service request; recording the user inputs and the program displays to obtain a sequence of user inputs and program displays; and generating a script file including the sequence of user inputs and program displays.

In the embodiments of the present application, the operation/display events of one or more applications are recorded to obtain an operational event sequence necessary for fulfilling the service request; a script file is generated based on the sequence of operation/display events; then the service request and the script file is associated together. When the user requests the same service request next time, the user-friendly apparatus of this application would retrieve the script file associated with the service request, and then execute the script file to fulfill the service request without user repeating the same operation again.

BRIEF DESCRIPTION OF THE DRAWINGS

FIG. 6A is a flowchart illustrating a method for building a script file according to certain embodiments.

FIG. 6B is a block diagram of an exemplary script file according to certain embodiments.

DETAILED DESCRIPTION OF THE EMBODIMENTS

Figure 1:
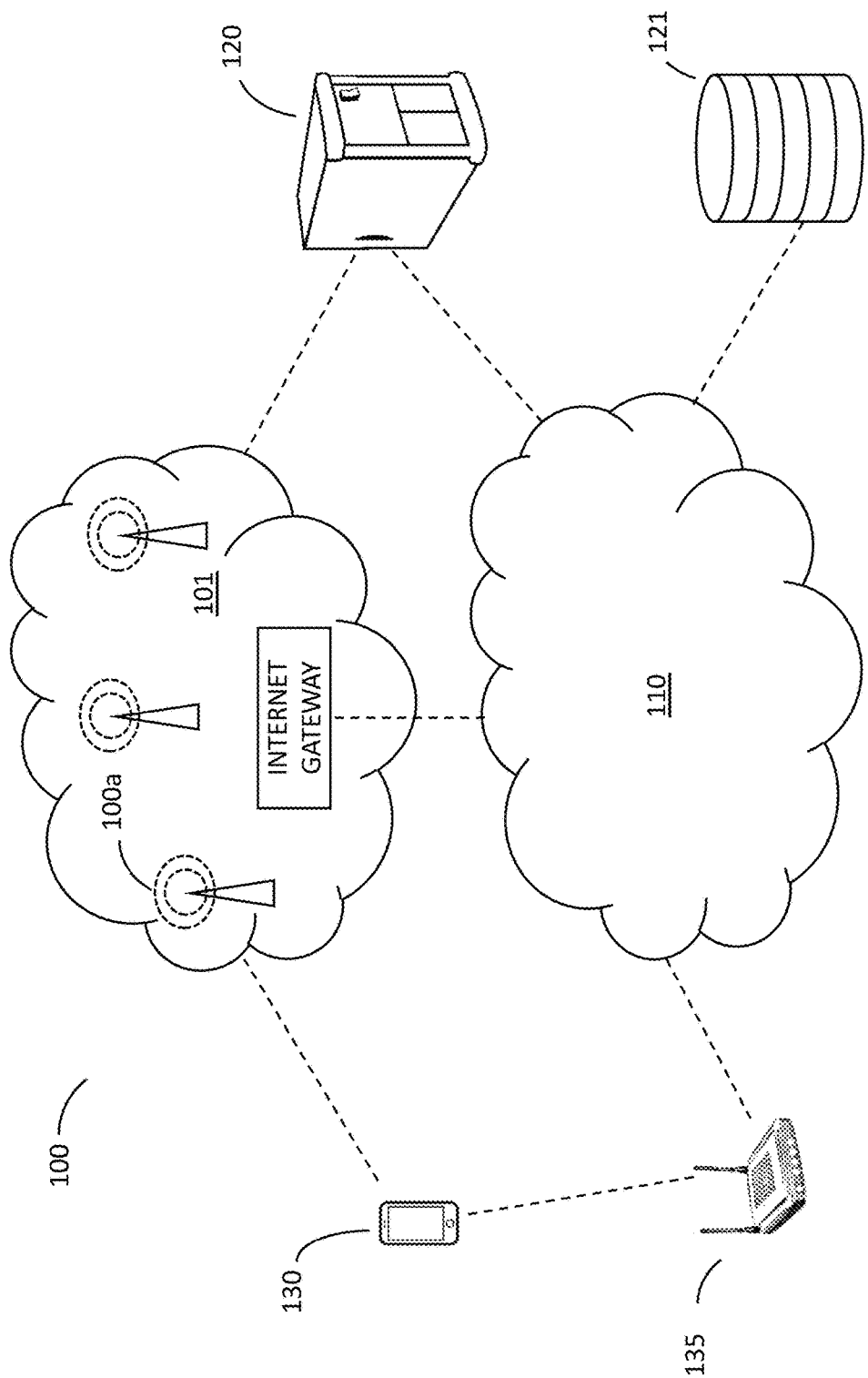
FIG. 1 is a diagrammatical representation of a packet-based network according to certain embodiments.

The technical solutions of the embodiments of the present application would be described in detail below with reference to the accompanying drawings.

In the description, the claims, and the figures of the present application, a number of operations occur in a particular order. It should be noted that these operations may not be executed in the order presented, either in sequence or in parallel. The reference numerals of the operations such as 101, 102 and so on, are used only to distinguish the different operations; they do not represent any of the execution order. In addition, the operation flow may include more or less operational items, and these operations may be performed sequentially or in parallel. It should be noted that the descriptions of "first", "second" and the like in this context are used to distinguish between different messages, devices, modules, and the like, they do not imply first or second in order, nor of different types.

The embodiments of the application would now be described, by way of example only, with reference to the accompanying drawings. It should be noted that the drawings and figures only reflect part of all possible examples. Based on the embodiments of the present application, all other embodiments obtained by those skilled in the art without making creative work are within the scope of the protection of the present application.

FIG. 1 illustrates a packet-based network 100 (referred sometimes herein as "the cloud"), which, in some embodiments, includes part or all of a cellular network 101, the Internet 110, and computers/servers 120, coupled to the Internet (or web) 110. The computers/servers 120 can be coupled to the Internet 110 using wired Ethernet and optionally Power over Ethernet (PoE), Wi-Fi, and/or cellular connections via the cellular network 101 including a plurality of cellular towers 101a. The network may also include one or more network attached storage (NAS) systems 121, which are computer data storage servers connected to a computer network to provide data access to a heterogeneous group of clients. As shown in FIG. 1, one or more mobile devices 130 such as smart phones or tablet computers are also coupled to the packet-based network via cellular connections to the cellular network 101, which is coupled to the Internet 110 via an Internet Gateway. When a Wi-Fi hotspot (such as hotspot 135) is available, a mobile device 130 may connect to the Internet 110 via a Wi-Fi hotspot 135 using its built-in Wi-Fi connection. Thus, the mobile devices 130 may interact with other computers/servers coupled to the Internet 110.

The computers/servers 120 can include server computers, client computers, personal computers (PC), tablet PC, set-top boxes (STB), personal digital assistant devices (PDA), web appliances, network routers, switches or bridges, or any computing devices capable of executing instructions that specify actions to be taken by the computing devices. As shown in FIG. 1, some of the computers/servers 120 are coupled to each other via a local area network (LAN) 110, which in turn is coupled to the Internet 110. Also, each computer/server 120 referred herein can include any collection of computing devices that individually or jointly execute instructions to serve as a script file server, as described in further detail below.

Figure 2:
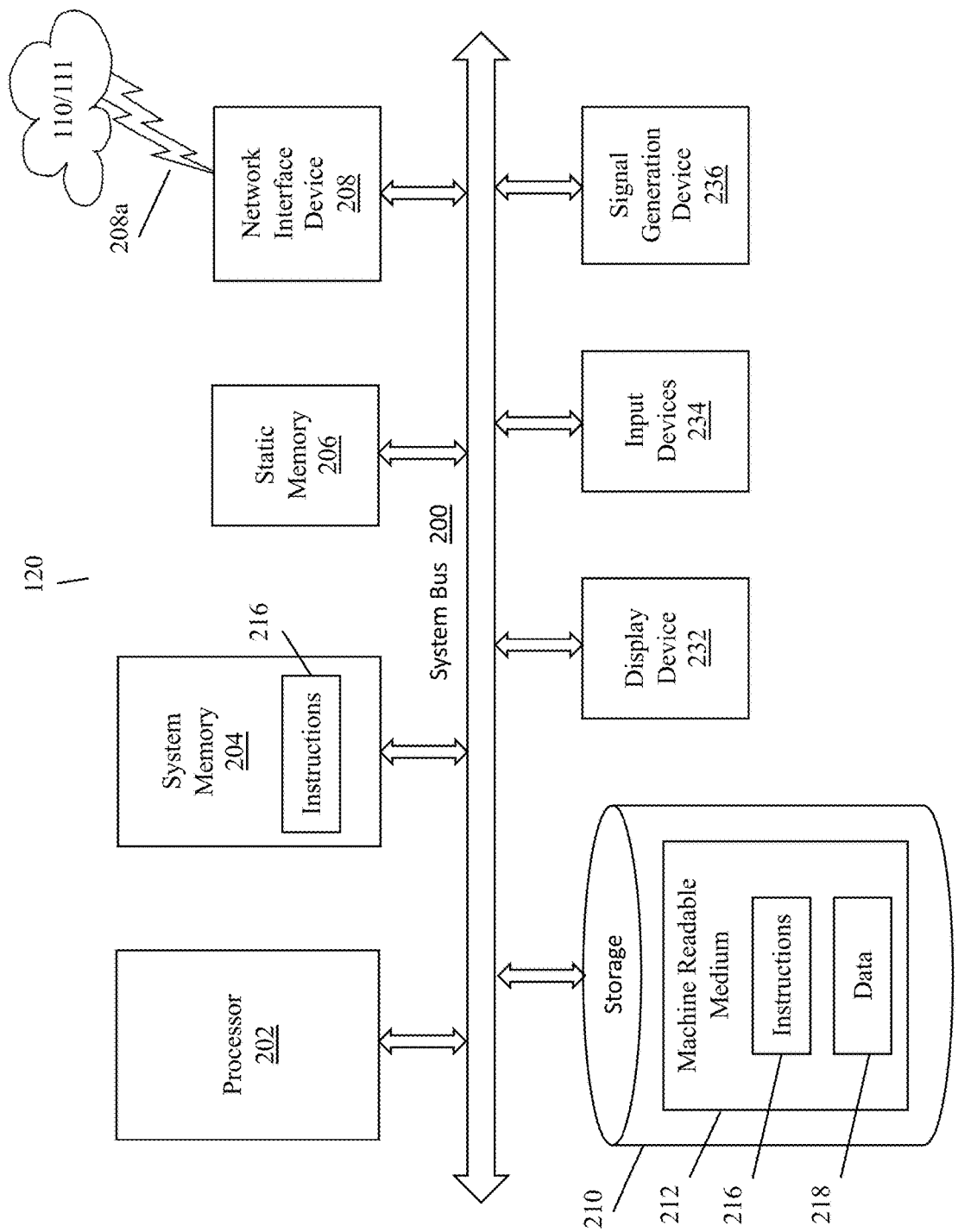
FIG. 2 is a diagrammatical representation of a computer/server in the packet-based network according to certain embodiments.

FIG. 2 illustrates a diagrammatic representation of a computer/server 120 according to certain embodiments. The computer/server 120 may operate as a standalone device or as a peer computing device in a peer-to-peer (or distributed)

network computing environment. As shown in FIG. 2, the computer/server 120 includes one or more processors 202 (e.g., a central processing unit (CPU), a graphic processing unit (GPU), and/or a digital signal processor (DSP)) and a system or main memory 204 coupled to each other via a system bus 200. The computer/server 120 may further include static memory 206, a network interface device 208, a storage unit 210, one or more display devices 232, one or more input devices 234, and a signal generation device (e.g., a speaker) 236, with which the processor(s) 202 can communicate via the system bus 200.

In certain embodiments, the display device(s) 232 include one or more graphics display units (e.g., a plasma display panel (PDP), a liquid crystal display (LCD), a projector, or a cathode ray tube (CRT)). The input device(s) 234 may include an alphanumeric input device (e.g., a keyboard), a cursor control device (e.g., a mouse, trackball, joystick, motion sensor, or other pointing instrument). The storage unit 210 includes a machine-readable medium 212 on which is stored instructions 216 (e.g., software) that enable anyone or more of the systems, methodologies or functions described herein. The storage unit 210 may also store data 218 used and/or generated by the systems, methodologies or functions. The instructions 216 (e.g., software) may be loaded, completely or partially, within the main memory 204 or within the processor 202 (e.g., within a processor's cache memory) during the execution thereof by the computer/server 120. Thus, the main memory 204 and the processor 202 also constitute machine-readable media.

While machine-readable medium 212 is shown in an exemplary embodiment to be a single medium, the term "machine-readable medium" should be taken to include a single medium or multiple media (e.g., a centralized or distributed database, or associated caches and servers) able to store instructions (e.g., instructions 216). The term "machine-readable medium" shall also be taken to include any medium that is capable of storing instructions (e.g., instructions 216) for execution by the computer/server 120 and that cause the computing device to perform any one or more of the methodologies disclosed herein. The term "machine-readable medium" includes, but not be limited to, data repositories in the form of solid-state memories, optical media, and magnetic media. In certain embodiments, the instructions 216 and/or data 218 can be stored in the network 100 and accessed by the computer/server 120 via its network interface device 208, which provides wired and/or wireless connections to a network, such as a local area network 111 and/or a wide area network (e.g., the Internet 110) via some type of network connectors 280a. The instructions 216 (e.g., software) and or data 218 may be transmitted or received via the network interface device 208.

Figure 3:
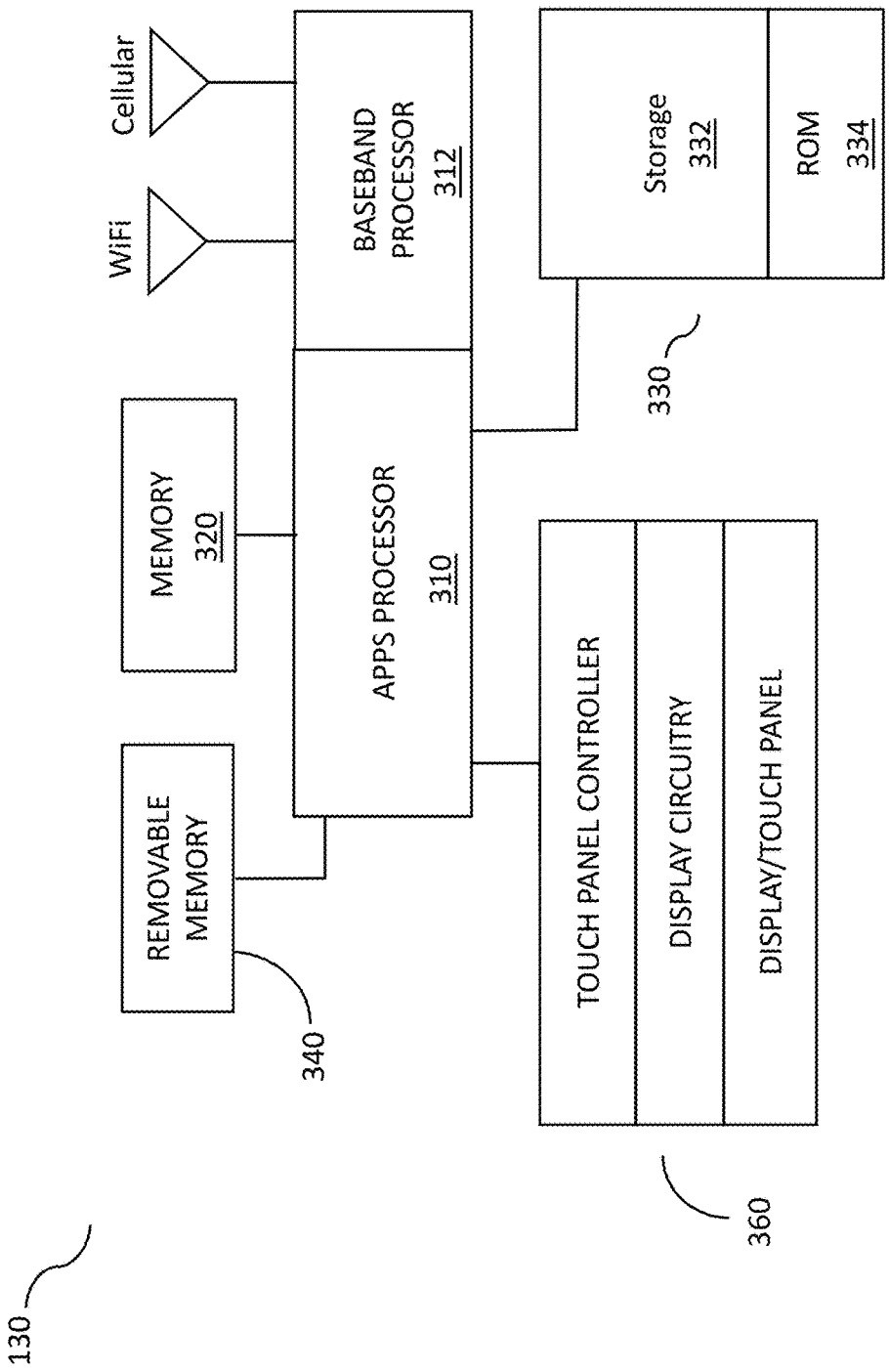
FIG. 3 is a diagrammatical representation of a mobile device according to certain embodiments.

As illustrated in FIG. 3, in certain embodiments, the mobile device 130 includes one or more processors, such as an Apps processor 310 and a baseband processor 312. The mobile device 130 may further includes one or more memory components for storing data and program codes.

Apps processor 310 executes application programs (Apps) stored in one or more of the memory components to carry out certain functions, such as receiving a service request from a mobile user and processing the service request, as described in further detail below. The memory components may include one or more memory chips such as dynamic random access memory (DRAM) 320 and storage (e.g., Flash) memory 330. In certain embodiment, the storage memory 330 includes a normal storage 332 for storing program codes and data that can be modified by the user, and an internal or read-only memory (ROM) storage 334 storing an operating system and core function applications that cannot be easily modified by the user. The mobile device 130 may further include one or more removable memory components 340, which may come in the form of one or more memory cards, such as SD cards. The baseband processor 312 processes communication functions so as to allow the mobile device 130 to interact with the network 100 or a local computer system via its Wi-Fi or Cellular connections. The mobile device 130 further includes a input/output module 360, which may include a screen or display/touch panel (if the display is also used as a user input device), a touch panel controller, and display circuitry. The mobile device 130 may be any mobile device including a mobile phone, a tablet computer, a PDA (Personal Digital Assistant), a POS (Point of Sales), a car computer, or the like.

The mobile device 130 is installed with an operating system (e.g., the Android®, iOS®, or Windows®) and with mobile apps that run on the operating system. Each mobile App includes a collection of somewhat related activities. An App activity in a mobile App is a single, focused component that a user can interact with, often by touching a user interface (UI) element on the display/touch panel. It includes a process/function that does something for the user, for example, dialing the phone, taking a photo, sending email, viewing a map, scanning a QR code, displaying social network messages, etc. The activities in a mobile App are usually organized in a hierarchical structure (i.e., an activity tree), with an activity in one level providing triggers to activities in lower levels. Less used activities are usually placed lower in the hierarchy that a user may have to tap up and down the hierarchy multiple times to find it. Although the embodiments described herein use mainly Android centric terms, they can be readily modified to extend into iOS and Windows Operating Systems.

Figure 4:
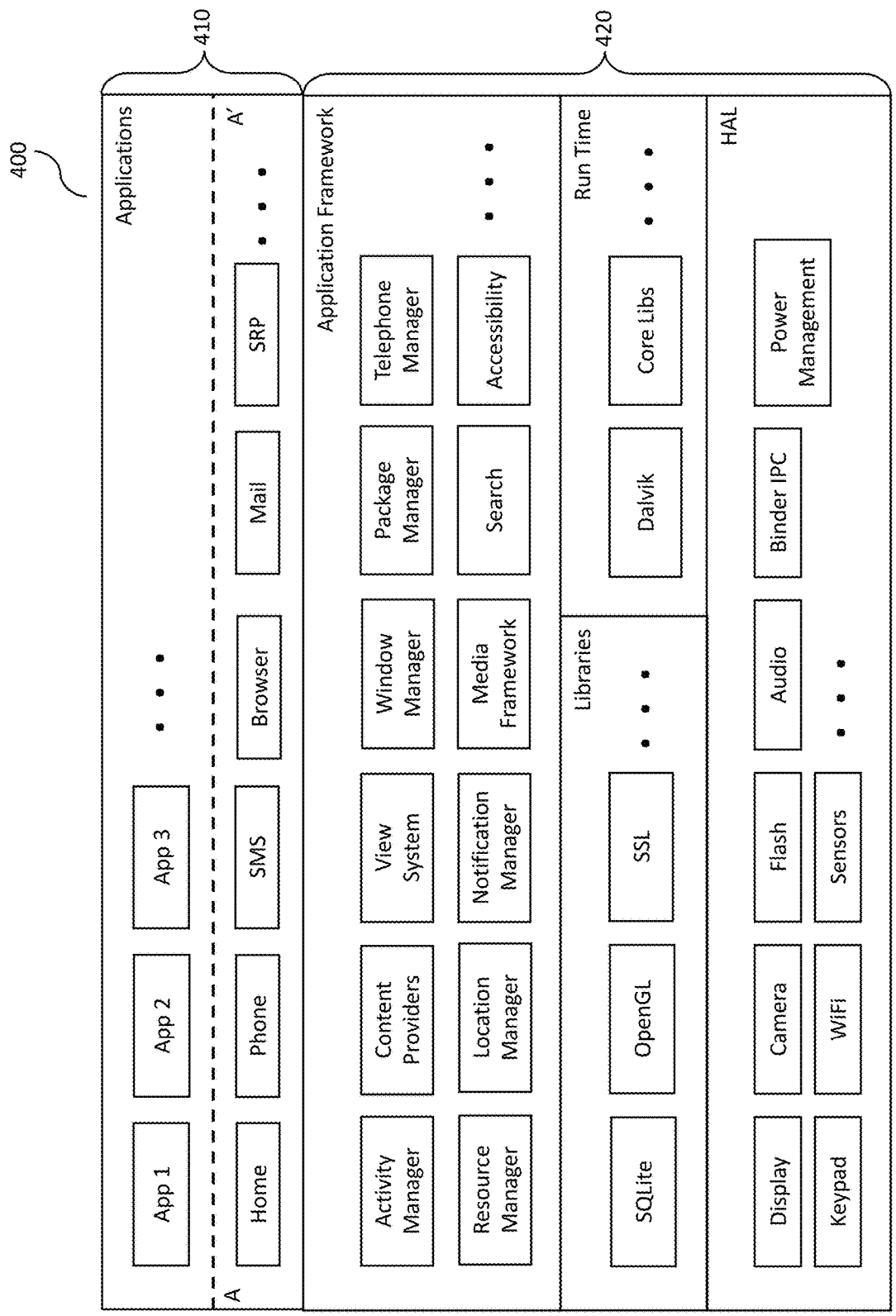
FIG. 4 is a block diagram of a software stack in the mobile device according to certain embodiments.

FIG. 4 is a block diagram illustrating a software stack 400 associated with the mobile device 130. As shown in FIG. 4, the software stack 400 includes an applications layer 410 over a mobile operating system 420. The mobile operations system 420 (e.g., the Android Operating System) includes an application framework layer over libraries and run time layer, which is built over a hardware abstraction layer (HAL) responsible for discovering, enumerating and mediating access to most of the hardware components on the mobile device 130, including the display/touch panel, and home buttons etc. The applications layer 410 includes the core function applications required to allow the device to be used as intended, such as Home interface, phone and dialer interface (Phone), calendar, messaging system (SMS), email interface (Mail), etc. The application layer 410 may further include optional applications (shown as App1, App 2, App 3), such as applications downloaded from another computer or the Internet.

Still referring to FIG. 4, The libraries and run time layer includes a plurality of runtime libraries such as SQLite, OpenGL, SSL, Dalvik virtual machine, and Java core libraries, etc. The application framework layer includes an activity manager, content providers, a view system, and window, package, telephone, resource, location and notification managers. The application framework layer further includes media framework, search services and accessibility services. The hardware abstraction layer includes sets of routines in software that emulate some platform-specific details, giving programs direct access to the hardware resources on the mobile device, such as display/touch screen, camera, flash, audio, keypad, Wi-Fi, sensors, etc. It also includes the Android Inter-process communication (IPC) binder, which is a framework for the exchange of signals and data across multiple processes, and power management routines.

The operating system 420, together with the core function software (part of applications layer 410 under the dashed line A-A') are stored in the ROM 334 of the mobile device, as illustrated in FIG. 3, and are sold together with the mobile device, while the optional applications App1, App2, App3, etc. are usually installed by the user of the mobile device and stored in the storage 332.

Figure 5B:
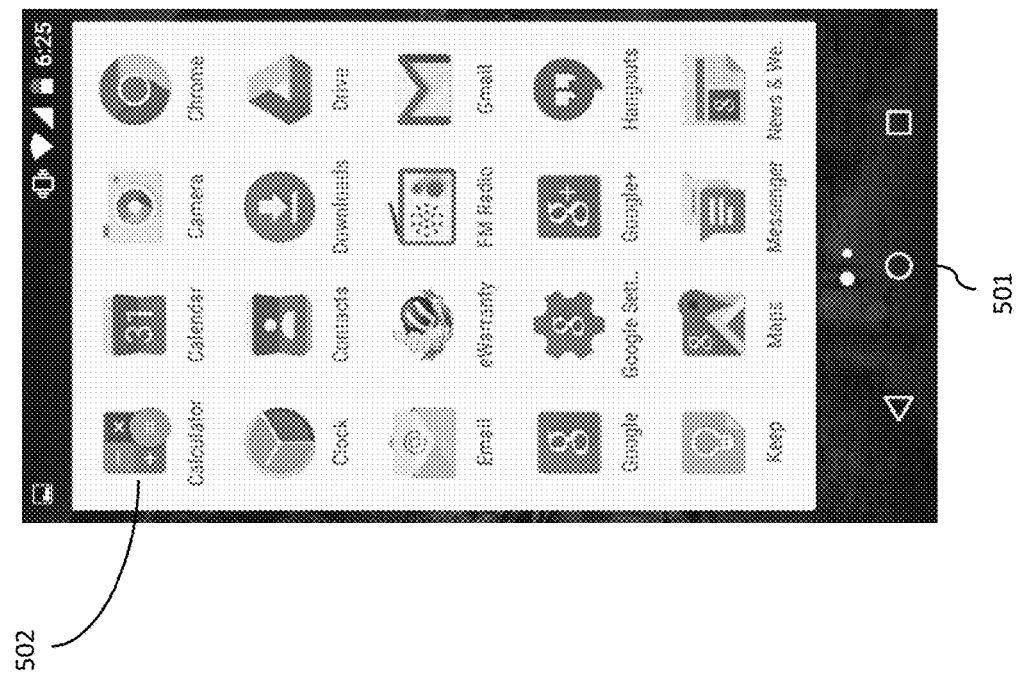
FIG. 5B is a photograph of a mobile device showing a home screen according to certain embodiments.
Figure 5A:
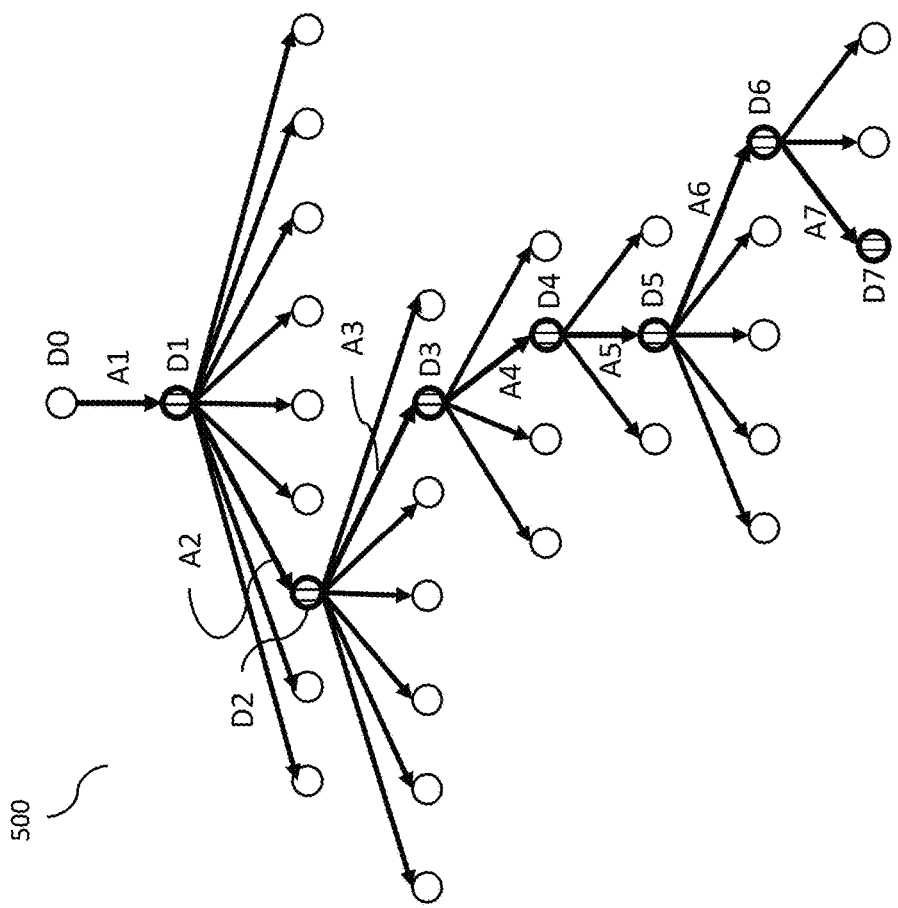
FIG. 5A is a diagrammatical representation of a series of operational steps used to fulfill a service request according to certain embodiments.

FIG. 5A illustrates an exemplary process 500 of using the mobile device 130 to serve a need of a user. Here the circles represent the different displays on the screen of the mobile device and the arrows are links that the user can act on to cause the mobile device 130 to display the corresponding displays on the screen. The process 500 starts when the mobile device 130 is illustrating display D0 on its screen. From here, the user clicks a home button 501 (action A1) to bring the mobile device 130 to the home screen D1, as shown in FIG. 5B, a plurality of icons 502 are displayed, which provide links to respective applications. By clicking one of the icons (action A2), the user cause the mobile device to display D2 on its screen, which may be the home page of an application, which can be any of the other applications (hereafter, "service application") in the applications layer 410 shown in FIG. 4. On the home page of the service application another set of links or search input window are provided, allowing the user to take further actions. This process continues as a series of actions and displays on one or more service applications (A1>D1>A2>D2>A3>D3>A4>D4>A5>D5>A6>D6>A7>D7) until the mobile device shows displays D7 desired by the user. In certain embodiments, the actions can be any of the actions a user can take using the mobile device, such as clicks, swipes, searches, texting or voice calling, selecting multimedia files to play, etc.

Although a large supply of Apps are available nowadays for installing on mobile devices to perform various services for the mobile users, the users still need to manually navigate through a series of actions/displays, as illustrated in the above examples, to obtain the desired services. Moreover, when the users need to obtain the same or similar services again, the users may have to go through the same series of actions/displays again. The apparatus and methods according to certain embodiments overcome this issue by allowing the a user to teach the mobile device 130 the actions/displays sequence used by the user to fulfill a service request. The learned actions/displays sequence is processed and stored in a script file, which is used later by the mobile device 130 to simulate automatically the actions/displays required to fulfill the same or similar service request upon receiving such a service request from the user.

FIG. 6A is a flowchart illustrating a process 600 of building a script file associated with a service request according to certain embodiments. The process 600 comprises of receiving the service request (601), monitoring operation/display events on the mobile device to obtain a sequence of operation/display events (e.g., sequence of actions and displays) used by the user to fulfill the service request (602), generating a script file according to the sequence of operation/display events (603), and associating the script file with the service request (604). The script file is used to bring about automatically a set of actions/displays to get to the desired result the next time the user wants to use the mobile device to serve the same need again, so that the user does not have to manually repeat the sequence of actions and displays to get to the desired result.

It should be noted that the steps in process 600 may be performed by one device, or multiple devices/systems. For example, step 601 to step 604 may be carried out by a mobile device 130, or by a server 120. Or, for example, steps 601 and step 602 may be carried out by a mobile device 130 while steps 603 and 604 are carried out by a server 120.

The service request may be received via any of voice, text, or other input means. It may be requested by a user, by a device or by an application. In certain embodiments, the service requests may be entered through an interface provided by an assist application, the service request processor (AP), which can be one of the optional applications (e.g., App2) in the applications layer shown in FIG. 4, or an application installed in the ROM 334 together with the other core function software applications, as shown in FIG. 4.

For example, a service request such as "buy a bag of coffee and send to office" can be entered using either audio input or text input or by selecting an service request option on the interface of the assist App (referred sometimes herein as the AP) after the AP is called. The audio input can be made via an audio collecting device (such as a microphone) of the mobile device 130. The text input may be made through a physical keyboard or a soft keyboard input of the mobile device 130. The service request option may be at least one of the options presented in the AP interface, such as icon options, text options, and the like. Users can click the corresponding icons or hyperlinked texts, and the AP would generate the appropriate service requests. For example, a user may buy a certain brand of coffee, send a gift card, transfer money, etc., on a regular basis. The AP can provide icons or links to the options for buying coffee, sending a gift card, or transferring money, etc. . . . . So, instead of entering the service request via voice or typing, a user can simply click on the coffee option to buy his favorite coffee, click on the a gift card option to send a gift card to a friend, or click on the transfer money option to pay a vendor. The AP generates the specific service requests based on the user click and the content of the service option. In certain embodiments, a service request may be based on a combination of any two or three options, i.e., the service request voice, the service request text, and the service request option. For example, after a user click on the gift card option, a contact person is then required, prompting the user to enter the contact person by text or voice. The AP would then generate the corresponding service request.

Figure 7A:
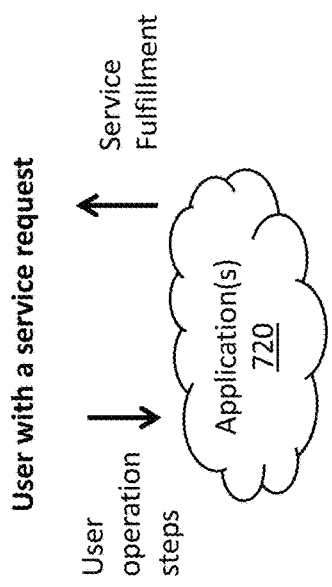
FIG. 7A is a diagrammatical representation of a process to fulfill a service request using manual navigation according to certain embodiments.
Figure 7B:
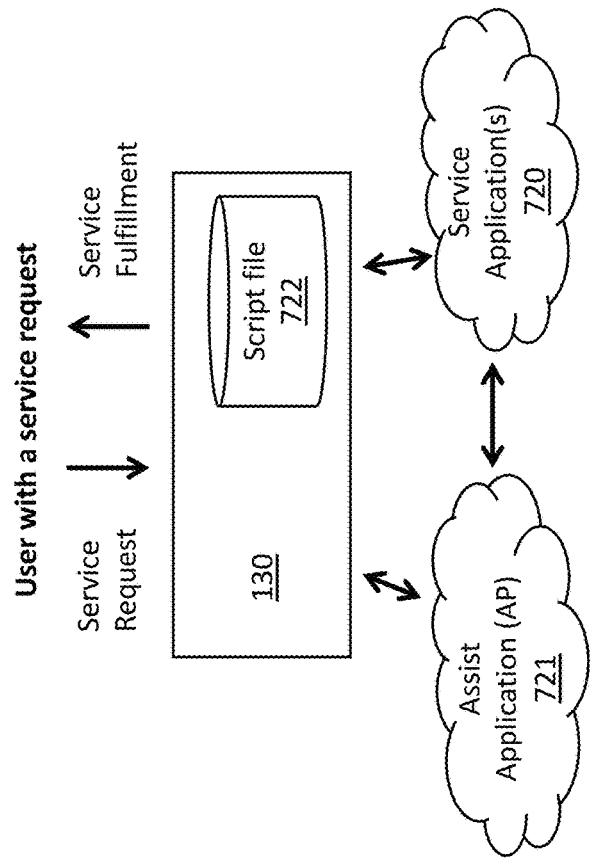
FIG. 7B is a diagrammatical representation of a process to fulfil a service request by automatically executing a script file according to certain embodiments.

FIGS. 7A and 7B illustrate how a service application 720 and the assist application (i.e., the AP) 721 are used to serve a need of the user according to certain embodiments. The service application can be a specific service provider application, such as WeChat, Uber, Pizza delivery, etc., Installed or to be installed on the mobile device 130. As shown in FIG. 7A, the user can operate step by step on the service application 720 to serve a specific need. As shown in FIG. 7B, using the method and apparatus of the present application, the assist application (i.e., the AP) 721 is involved and the user can simply place a service request to the mobile device 130 and the mobile device would fulfill the service request automatically. In certain embodiments, the service request is fulfilled by the AP interacting with the service applications according to the operational steps in the script file 722 corresponding to the service request. The script file 722 was generated in the process 600 when the user performed the operational steps on the service application under the observation of the AP.

The service application and the assist application described above may be the same application or two different applications. When the service application 720 is different from the assist application 721, the assist application (i.e., the AP) provides the entry point for the users with input service options, and retrieves the script file associated with the service request. The AP can display a page element corresponding to the extracted script file on an interface for the user; and after the user clicks the page element, it executes the script file to realize the service request desired by the user toward the service application. In another word, the execution of the script file is essentially running the sequence of events which associated with the script file, in order to simulate the user experience when the user operated the service application for the corresponding service needs.

The service application 720 according to certain embodiments may also be referred to as the service application software or the application programs developed by a third party (other than the user or the phone manufacturer). The service application may be an application software program or a combination of application software programs installed in the normal storage 332 of the mobile device 130, or a core software program or a combination of core software programs embedded in the ROM 334, or a combination of both. The assist application (i.e., the AP) 721 may also be referred to as an assist application software or an assist application program. Likewise, the assist application may be an application software installed in the mobile device 130, or a software tool embedded in the ROM of the mobile device 130. In certain embodiments, the assist application program acts as a unified service portal through which the user can enter the service request; while the service application program provides the service to fulfill the service request. The assist application program then interacts with the service application program so as to automatically operate the corresponding options of the service application program based on the script file associated with the service request. It can simulate human operations (clicks, search queries, dial numbers for phone calls, selecting multi-media files to play on the device, etc.) so as to complete the service request of the user. In certain embodiments, the interactions between the assist application and the service application may be realized using the accessibility services of the operating system 420. In other word, the assist application (i.e., the AP) sends a sequence of instruction to the service application, corresponding to the operational event sequence associated with the script file. At the same time, it also acquires every interface after each operational event from the service application program.

A service in the operating system 420 is a software component that can perform long-running operations in the background without a user interface. An application can start a service and it would continue to run in the background even if the user switches to another application. Additionally, an application can bind to a service to interact with it and even perform inter-process communication (IPC). For example, a service can be called to handle network transactions, play music, perform file I/O, or interact with a content provider, all from the background. The accessibility services in the operating system 420 are originally designed to provide alternative navigation feedback to the user on behalf of applications installed on the mobile device 130. An accessibility service can communicate to the user on an application's behalf, and facilitate functions such as converting text to speech, or sending haptic feedback when a user is hovering on an important area of the screen. It can also be set up to process information received from the application, and report that information back to the user.

The accessibility services can include many service components. These service components can be called to receive specific types of accessibility events, listen to specific user input, capture screen display, simulate triggering information to the service application(s) in order to perform the methods described herein.

Figure 8A:
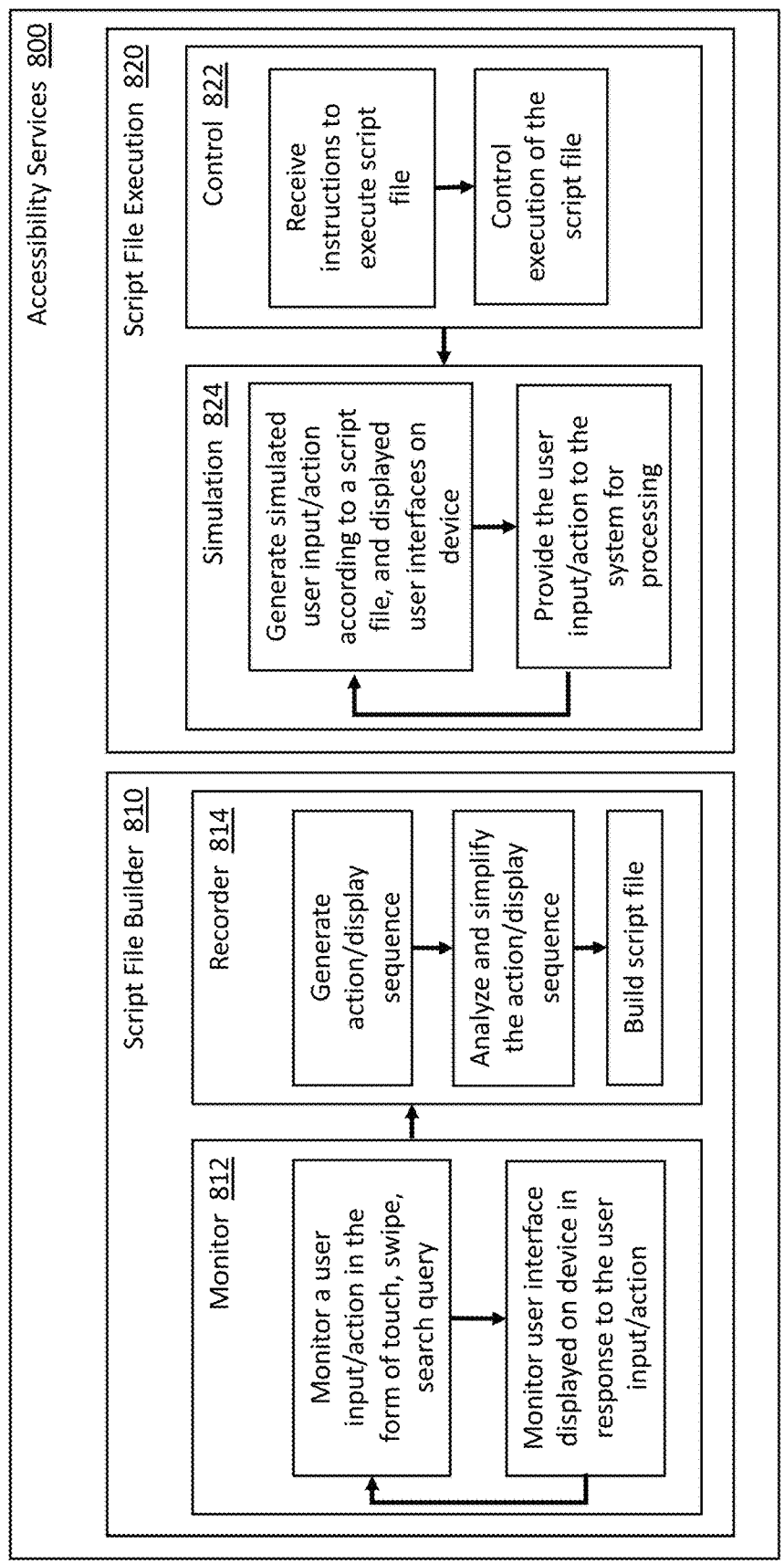
FIG. 8A is a diagrammatical representation of accessibility services according to certain embodiments.

In certain embodiments, the accessibility services in the operating system 420 include functions not found in the accessibility services of conventional Android operating systems. As shown in FIG. 8A, the accessibility services 800 in the operating system 420 include a script file builder service 810 and a script file execution service 820. The script file builder service 810 includes a monitor function 812 and a recorder function 814. In certain embodiment, the assist application (i.e., the AP) is bound with the accessibility services 800 and uses the monitor function 812 to monitor user inputs/actions in the form of, for example, touches, swipes, or search queries entered on the screen of the mobile device 130. The monitor function 812 also monitors user interface displayed on the mobile device 130. The assist application 721 also uses the recorder function 814 to generate an action/display sequence, analyze and simplify the action/display sequence, and build a script file using the action/display sequence.

In certain embodiments, the script file execution service 820 is used by the assist application to process a service request that has a corresponding script file. The script file execution service 820 includes a control function 822 and a simulation function 824. The control function 822 receives instructions from the assist application to execute a script file and controls the simulation function 824 as the simulation function 824 generates simulated user inputs/actions according to the script file and the display on the device, then interact with the assist application and/or the service application as the user inputs/actions are processed.

As discussed above, the mobile device 130 may be installed with multiple service applications. When several service applications 720 are involved in a service request, the associated script file may include an operational event sequence with each event identified with a particular service application. In other words, each script file contains a sequence of at least two main types of information, one is the information to identify a display in a corresponding service application 720, for example, a display in the WeChat program; the other is the information on the action required to reach the display, i.e., a step of operation that the user would manually perform in the corresponding service application program or another service application program. In other word, the script file includes an interleaved action/display sequence to complete the corresponding service request in one or more service applications.

Figure 8B:
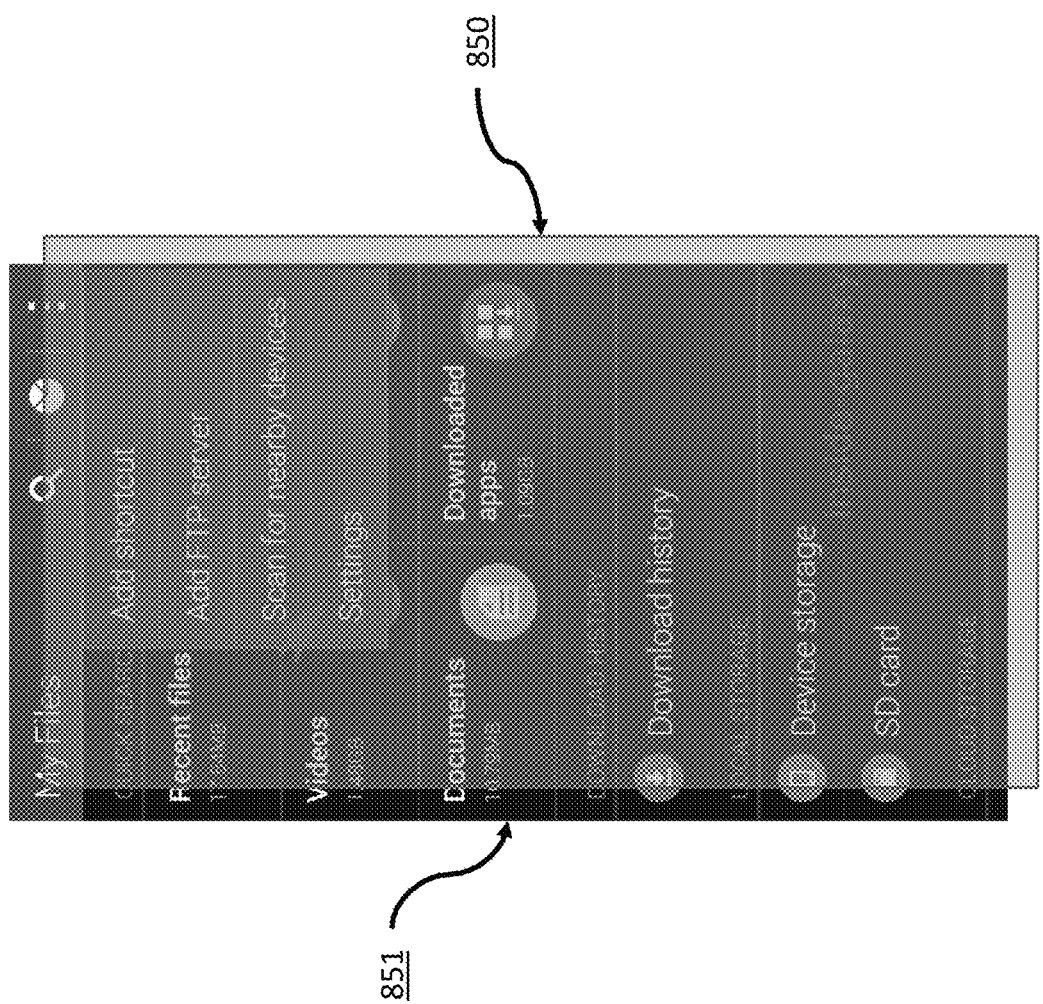
FIG. 8B is a diagrammatical representation of displays on the mobile device according to certain embodiments.

In certain embodiments, building the script file also requires interactions between the service application(s) 720 and the assist application (i.e., the AP) 721. For example, the assist application program may provide a transparent display 850 that overlays each display 851 of the service application program, as shown in FIG. 8B, so as to capture user inputs on the service application program during process 600. Thus, recording the operation/display events of the service application is essentially an operation to document the user actions with respect to the service application. For example, if a user wants to use the WeChat APP to send a red envelope to Tom with a gift amount of $20, the recording procedure for documenting the user action (operating events) to operate the WeChat APP would include (as shown in FIG. 5A):

Action A1—returning to home screen (Display D1);
Action A2—launching the WeChat application (Display D2);

Action A3—searching the address book to find Tom (Display D3);

Action A4—triggering a control key to launch a message interface (Display D4);

Action A5—selecting the red envelop option in the message interface (Display D5);

Action A6—entering the amount and hit return (Display D6); and

Action A7—clicking send (Display D7).

These user actions on the displays are recorded to obtain the sequence of operation/display events required to fulfill the red envelope service request. And this sequence is used to build the script file 610 shown in FIG. 6B. In certain embodiments, the operation/display event sequence may be a series of operation instructions. Thus, the execution of the script file 610 is to sequentially input operational instructions to the service application to simulate the user's actual action steps (e.g. clicks and text inputs, etc.) for achieving the service requests in the service application. As shown in FIG. 6B, the script file may also include other information such as the device ID for the mobile device 130, the service request, and some context information, etc. The script file may be stored locally in the mobile device 130 in association with the corresponding service request. It may also be transmitted together with the service request to a server 120 in the packet-based network 100 and stored in a storage at the server side.

Figure 9:
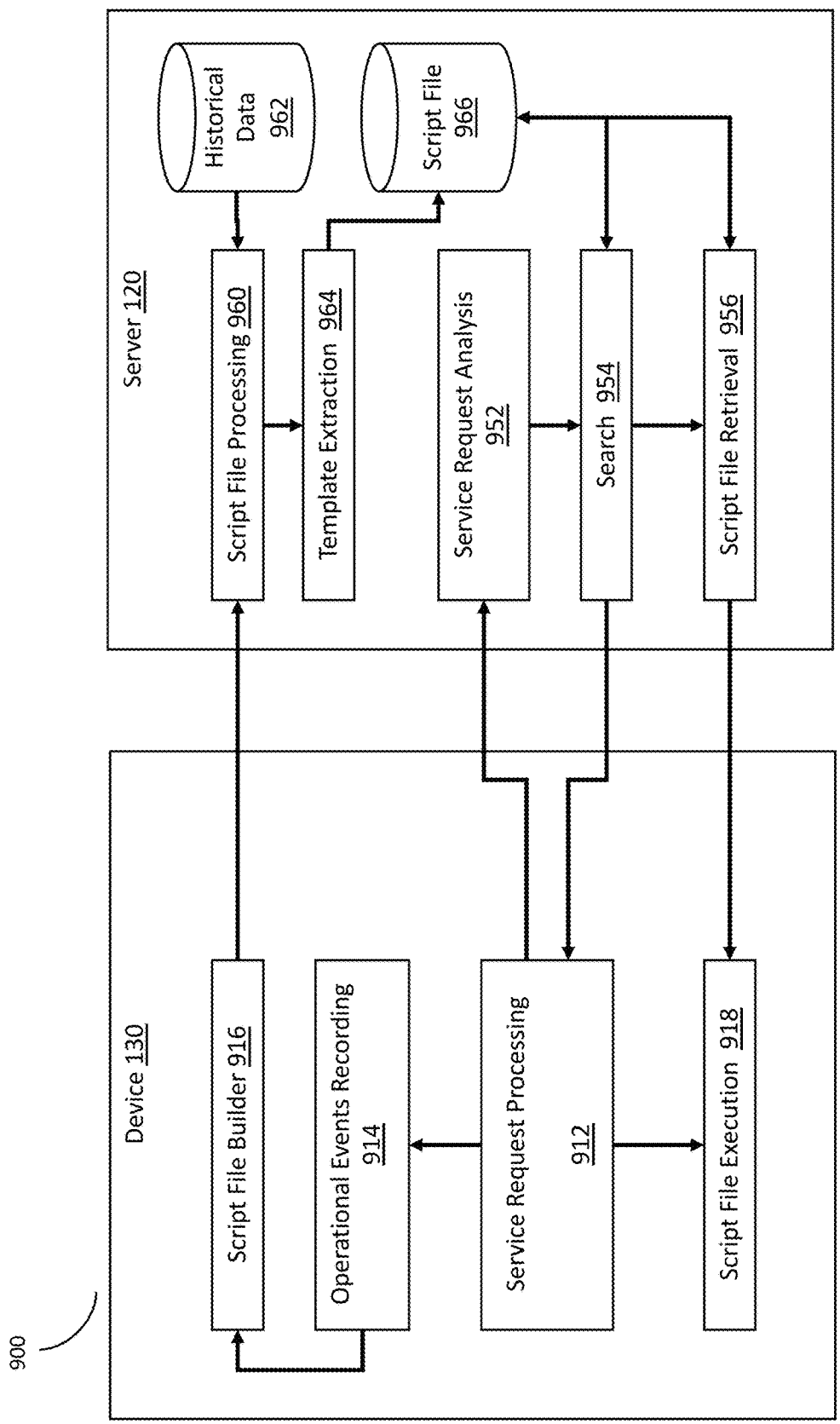
FIG. 9 is a diagrammatical representation of a system for processing service requests according to certain embodiments.

FIG. 9 is a diagram illustrating a system 900 for processing a service request according to certain embodiments. As shown in FIG. 9, the system 900 includes a device (e.g., mobile device 130) and a server (e.g., server 120) coupled to each other either directly or via a local or wide-area network (e.g., network 100). The device 130 provides a service request processing module 912, an operation/display events recording module 914, a script file building module 916, and a script file execution module 918. The server 120 provides a service request analysis module 952, a search module 954, and a script file retrieval module 956. The server 120 further provides a script file processing module 960, a historical data store 962, a template extraction module 964, and a script file store 966.

In certain embodiments, the service request processing module 912 receives a service request and transmits the service request to the service request analysis module 952, which analyzes and simplifies the service request and forward the service request to the search module 954. The search module 954 searches in the script file database 966 for a script file corresponding to the service request and informs the service request processing module 912 whether or not a script file corresponding to the service request is found. In response to the script file being found, the script file retrieval module 956 retrieves the script file and transmits the script file to the script file execution module 918, which works with the script file execution service 820 to execute the script file. The script file may be transmitted over network 100 in one or more data packets.

Thus, after the service request is associated with a script file, the script file can be retrieved based on the associated service request, and then executed without the user repeating the same operations. Here, the service request can be acquired by certain user input through the assist application (i.e., the AP), which obtains a script file associated with the service request in response to a service request input through the assist application, and then executes the script file.

In certain embodiments, in response to the script file not being found, the service request processing module 912 prompts for user input on whether to generate a script file for the service request. In response to the user choosing to teach the mobile device to process the service request by generating a corresponding script file, the operation/display events recording module 914 works with the monitor function 812 of the script file builder service 810 to monitor the operation events as the user navigate through a set of actions/displays to fulfill the service request manually. The script file builder module 916 works with the recorder function 814 of the script file builder service 810 to build the script file and then transmits the script file as one or more data packets to the server 120 via the network 100.

The script file processing module 960 provided by the server 120 receives the script file and the template extraction module 962 generalizes the language of the service request associated with the script file so that it covers the same or similar service requests which are worded differently, based on the historical data 962 on various wordings used to form service requests of a certain types. For example, the service request of "download Google Maps" may also be worded as "install Google Maps," and the script file processing module 960 would generalize the service request of "download Google Maps" to also mean "install Google Maps." The template extraction module 962 is used to parse the script file into a general portion and a specific portion, and associate the general portion to a template service request corresponding to a category of service requests. For example, general portion of the script file for "install Google Maps" would be linked to a template service request of "Install ** Apps" and it involves only those actions/displays before a specific App is selected to be installed. The template script file can then be used to fulfill the service requests for downloading any apps. The script file or the template script file is associated with the service request or the template service request and stored in the script file database or data store 966.

As further examples, the service request of "buy a bag of coffee and send to office" can be generalized as "buy  and send to ", where "" indicate a variable. The service request of "play Taylor Swift's song", can be generalized into "playing  song"; or the service request of "send a red envelope to Tom with $20" can be generalized into "send red envelope to  with ". According to certain embodiments, associating a script file with a service request involves creating a request template according to the service request and associate the request template with the script file.

Here, creating the request template according to the service request is done by semantically analyzing the service request to obtain a semantic backbone and using the semantic backbone as the request template. For example, semantic analysis of the service request "buy a bag of coffee and send to office" would have the semantic body "buy  send to "; or "play Taylor Swift's song" would have the semantic body "play  song"; Or "send a gift card to Tom with $20" would have the semantic body as "send a gift cards  to "; and so on. In practical applications, it is possible that two semantic bodies have different format, but have the same semantics. For example, the semantic backbone 1 of "play  song" and the semantic backbone 2 of "Listen to  song" are two different semantic bodies, but they expressed the same meaning semantically. Thus, the present embodiment can assimilate such semantic backbones, for example, by grouping the semantic backbone 1 and the semantic backbone 2 into the same semantic backbone as "play  song". Alternatively, the semantic backbone 1 and the semantic backbone 2 can be associated with the same script file, i.e. a script file may be associated with one or more semantic backbones.

According to embodiments, the recording of the operation/display events of the service application may be automatically executed after receiving the request or may be executed after being triggered by other events. Such triggering events in certain embodiments may include several paths:

Path 1. If there is no script file associated with the service request at the local device (i.e., mobile device 130), the process would start the recording mode (i.e., the recorder function 814 in the operating system 420 is activated).

Path 2. If the script file associated with the service request is not acquired from the server side, the process would start the recording mode.

Path 3. The process may start the recording mode in response to a recording command triggered by the assist application.

The executing object of the process mentioned in path 1 above may be a server (e.g., server 120) or a client (e.g., mobile device 130). When the execution object is a server, the service request and the script file are stored on the server; and the server inquires whether there exists a script file associated with a particular service request. If such script file is not found, the server sends the instruction to the client side to start the recording mode. When the execution object is a client, the service request and the script file can be associated and stored at the client side, who can inquire whether a script file associated with the service request exists locally. If such script file is not found on the client side, the recording mode is started. So that the client can perform a real-time monitoring and recording of the operating behavior of the user.

The execution object of the path 2 described above may be a client. After receiving the service request, the client sends the acquisition request to the server. If there is no script file associated with the service request on the server side (for example, client receiving server feedback information of zero result toward the query), the client would start the recording mode, to perform real-time monitoring and recording of the user's operating behavior.

In the triggering path 3 described above, the service request is input through the assist application 721 by the user. After the assist application (AP) obtains the service request, it would query locally about whether there is a script file associated with the service request or retrieve a script file associated with the service request from the server side. If there is no script file from the local device 130 or from the server 120, the assist application would display a prompt message regarding no corresponding information found. The user can then trigger the recording command through a recording button in the interface of the assist application, or a physical button on the mobile device 130 on which the assist application is installed. The assist application can initiate the recording mode in response to the recording command triggered in the assist application, so the client 130 can monitor and record in real time the user's operating behavior.

Further according to certain embodiments, if there is a script file associated with the service request on the client side, a page element corresponding to the script file is displayed. If the script file associated with the service request is acquired from the server side, the page element is generated on the server and sent to the client. The page element is presented in an interface of the assist application. Once the page element is triggered in the assist application, the script file is executed. The page element may be an icon, a character, a combination of both, or the like.

Thus, according to certain embodiments, a series of operation/display events in one or more service applications 720 is recorded to obtain an operational event sequence used to fulfill a service request; a script file is generated according to the operational event sequence; and this script file is then associated with the service request so that when the user have the service request again, the script file associated with the service request is retrieved and then executed to fulfill the service request without the user to repeat the operations again. This process provides convenience and time saving for the user.

The user here may be referred to as the user of the mobile device, or the server side (backend) technical staff. The user may set his/her own service requests according to his/her needs, such as purchasing a particular brand of coffee or a particular package, transferring money to someone (such as sending $20 to Mike for lunch), etc. After the request is set, the user may record the sequence of operational event, then generate a script file. The next time the user inputs a same service request, the script file corresponding to that service request can be called and the service request is fulfilled without the user repeating that same sequence of operations. Additionally or alternatively, the server side (backend) technical staff may set some common service requests (such as getting an Uber to SFO airport). The technical staff may then pre-edit these service request options on the server side. Each of the service request would have a recorded sequence of operation/display events in one or more service applications, and is associated with a script file for this recorded sequence.

Figure 10:
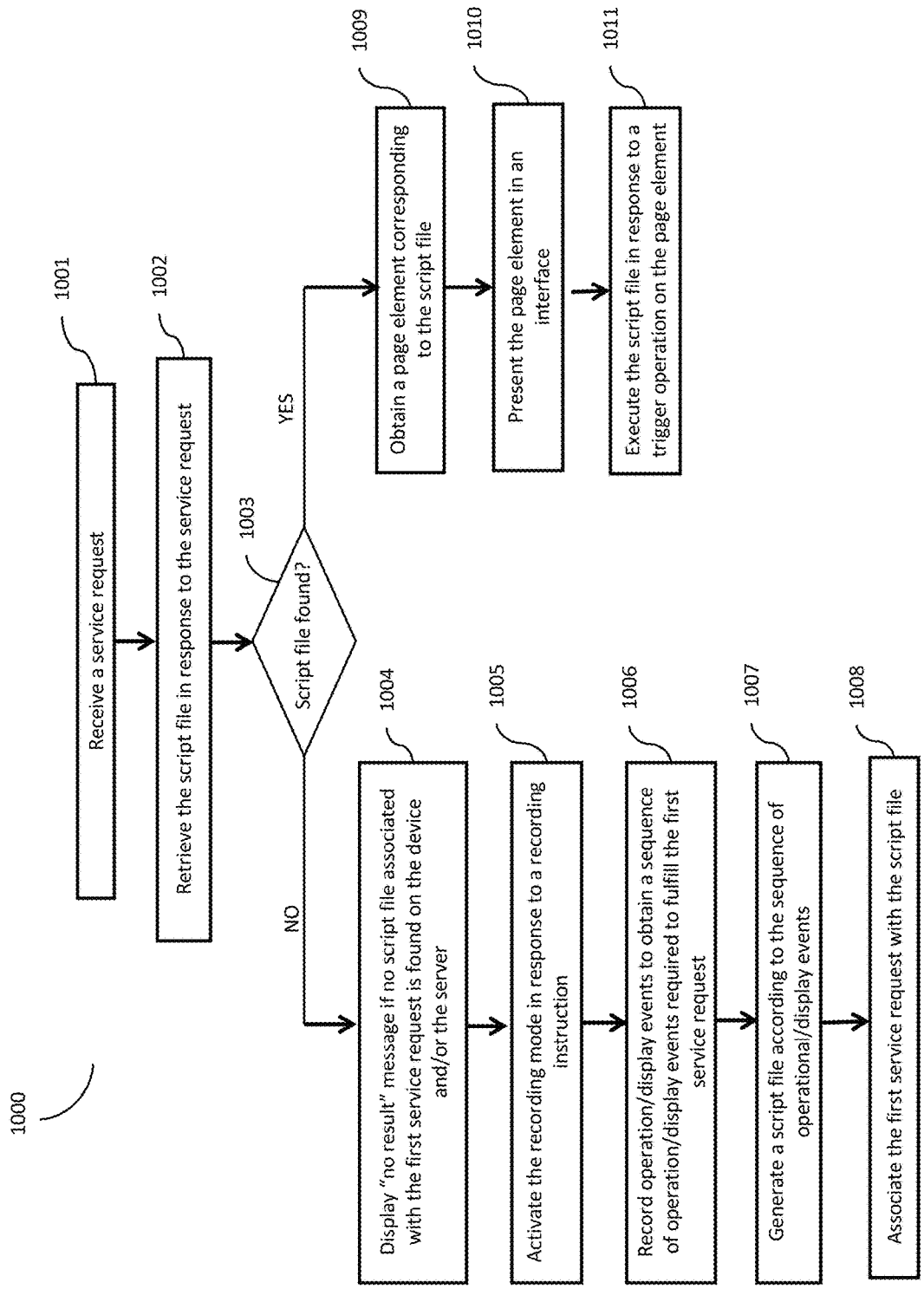
FIG. 10 is a flowchart illustrating a method for processing service requests according to certain embodiments.

FIG. 10 is a flow diagram illustrating a method 1000 according to certain embodiments. Method 1000 includes processes of correlating the service requests and the script files, obtaining the script file in response to a repeated service request, and executing the script file. As discussed above, method 1000 comprises:

1001. Receiving a service request input through the assist application (i.e., the AP).

1002. Responding to the service request entered through the assist application, retrieve the script file associated with the service request.

1003. If the script file is not found—proceeding to 1004.

1004. Displaying a "no result" message in the assist application interface if the query on the client side does not return a script file, or the server side does not return a script file associated with the service request.

1005. Activating the recording mode in response to a recording instruction triggered on the assist application. The recording instruction may be triggered by a user through a recording key in an interface of the assist application or a physical key of the mobile device 130 on which the assist application is installed.

1006. Recording the operation/display events of one or more service applications to obtain an operation/display sequence of events required to fulfill the service request.

1007. Generating a script file according to the operation/display event sequence.

1008. Associating the service request with the script file.

1104. If the script file is found—proceeding to 1009.

1009. Obtaining a page element corresponding to the script file if the script file associated with the service request is found, either on the client or the server side.

1010. Presenting the page element in an interface of the assist application.

1011. Executing the script file in response to a trigger operation for the page element through an interface of the assist application.

The technical scheme provided by the embodiments of the present application fulfills the service request of a user by simply fetching and executing the script file associated with the service request. The association of the service request with the script file eliminates the need to repeat the operations manually, therefore provide convenience for the user.

Figure 11:
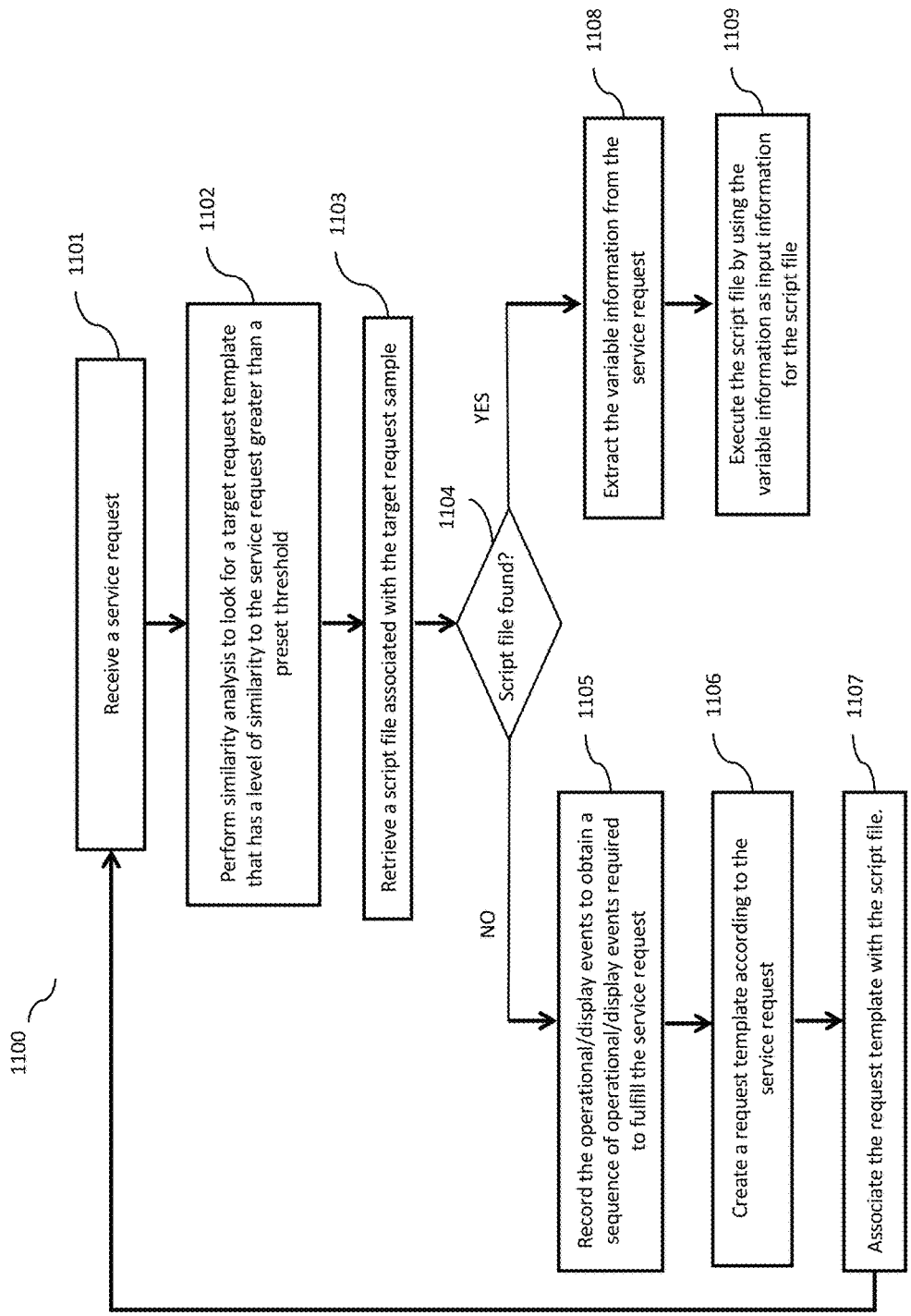
FIG. 11 is a flowchart illustrating a method for processing service requests according to certain embodiments.

FIG. 11 is a flow diagram illustrating method 1100 for processing service request according to certain embodiments. As shown in FIG. 11, the method 1100 comprises:

1101. Receiving a service request.

1102. Responding to the service request input on the assist application (i.e., the AP), performing similarity analysis with a variety of requests templates, to determine a target request template having a level of similarity to the service request greater than a preset threshold.

1103. Retrieving a script file associated with the target request template.

1104. If no script file is found—proceeding to 1105.

1105. Recording the operational events of one or more service applications to obtain a sequence of operation/display events required to fulfill the service request.

1106. Creating a request template according to the service request, including, for example, first performing a semantic analysis on the service request to obtain a semantic backbone; and then using the semantic backbone as the request template.

1107. Associating the request template with the script file.

1104. If a script file associated with the request template is found—proceeding to 1108.

1108. Extracting the variable information from the service request.

1109. Executing the script file by using the variable information as input information for the script file.

In step 1106, the semantic analysis may result in different semantic backbones for different service requests, even though these two service request may have similar meanings. One such example is the pair of "listen  song" and "play  song". Thus, in practice, the similarity analysis may be a semantic similarity analysis, a literal and sentence similarity analysis, or a combination of both.

In step 1108, the variable information may be extracted from the service request by a predetermined extraction policy. For example, in the service request "buy a bag of coffee and send it home", the item "bag", "coffee", "home" are the variable information. "Buy  send to " is the semantic backbone in the service request. The extraction strategy can be adjustable.

Thus, the number of associations between the service requests and the script files can be reduced by generalizing the service requests. For example, there are the two service requests "send a gift cards to Tom" and "send a gift cards to Lee", respectively. If each have an associated script file, it would obviously take up more storage space. By using a request template, the two service requests can be associated with the same script file. The only difference would be the variable information input when executing the script file.

In practice, there are situations where the variable information is divided into search information and non-search information. For example, in the service request "send a gift card to Tom with $20", "Tom" is search information; "$20" is non-search information. In the process of executing the script file, the executor needs to simulate the user's search operation in the address book to find Tom, and then carry out the follow-up operation to complete the action of inputting "$20," and finally finish the service request of sending money. However, in practice, there might be situations where the executor cannot find the data related to the variable information content after simulating the user operation for searching, so other strategies are adopted to determine the content from search results and use the information as input for the script file, for the execution to be continued. These other strategies may include, for example, selecting position-related information; or selecting the information with high content similarity, etc. Here selecting the position-related information means selecting the information at the designated position. The specified position can be set manually or automatically based on the position of the user's typical selection. For example, for the service request "buy a bag of coffee and send home", the variable information "coffee" is search information. But in the process of executing the script file, the executor simulates the user operation to search for coffee in the merchandize applications such as Amazon. The search results may contain many brands and flavors, the strategy here is to select the item with predefined position, such as the first item located in the search results. Then this selected item is used as input information for the script file, and the script file can be executed and the follow-up operation can be continued.

In certain embodiments, the operation/display events of a service application is recorded by the server 120 to obtain an operational event sequence used to fulfill the service request; the server 120 also generates the script file according to the operational event sequence and associate the script file with the corresponding service request. When the server 120 receives the same service request again, the script file associated with the service request is retrieved and sent to the mobile device 130 for execution. The server also process incoming service requests to extract request templates and variable information, which are used to reduce the number of stored script files.

Figure 12A:
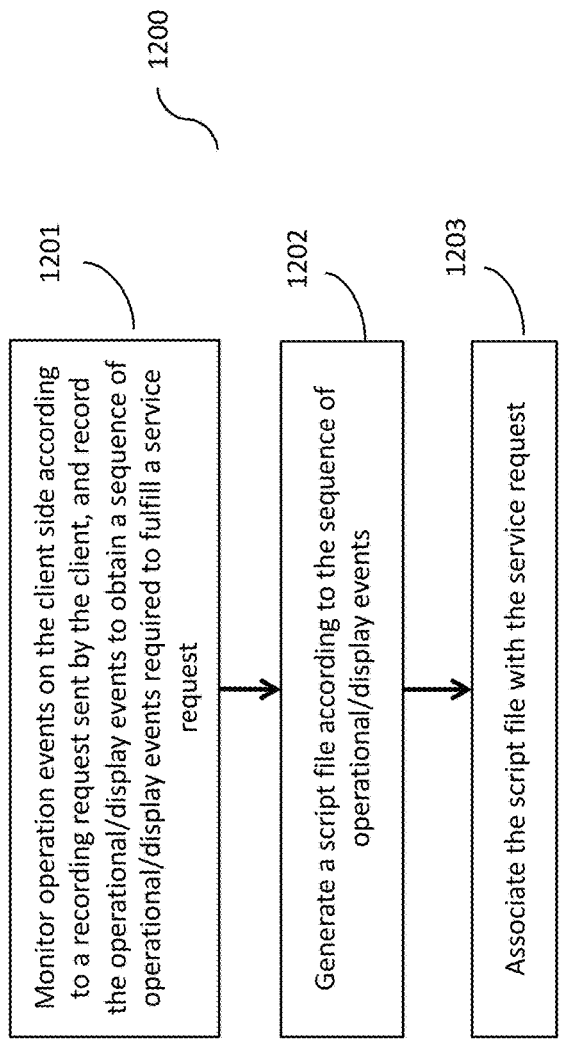
FIGS. 12A and 12B are flowcharts illustrating methods for processing service requests according to certain embodiments.

FIG. 12A is a flow diagram illustrating method 1200 for generating script files performed by the server 120. As shown in FIG. 12A, the method provided by the present embodiment can be implemented on the server side. In particular, the method 1200 comprises:

1201. Listening to the operational event on the client side according to a recording request sent by the client, and records the monitored operation/display events to obtain a sequence of operation/display events required to fulfill the service request.

1202. Generating a script file according to the operational event sequence.

1203. Associating the script file with the service request.

The service requests may be manually set by a server (back end) technical staff. The entry to input the service request may be provided by the assist application or provided by the editing interface of the server side; or, the service request may be entered by the user through the assist application on the client.

In step 1203, the service requests may be generalized by, for example, creating a request template according to the service request, and associating the request template with the script file. In certain embodiments, creating the request template can be done by semantically analyzing the service request to obtain the semantic backbone; and taking the semantic backbone as the request template.

Figure 12B:
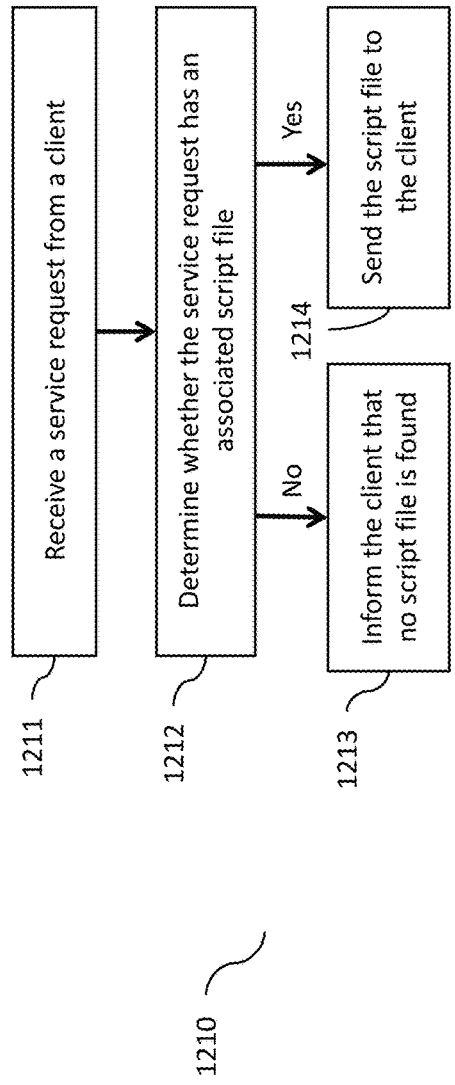

FIG. 12B is a flow diagram illustrating a method 1210 of processing a service request at the server 120. The method comprises:

1211. Receiving a service request sent by the client. The service request may be input by a user through the assist application (i.e., the AP) on the client side.

1212. Determining whether the service request has an associated script file, including performing a similarity analysis of the service request with a variety of request templates to determine a target request template having a similarity to the service request with a similarity value greater than a preset threshold.

1213. In response to the target request template not being found, informing the client that no script file is found.

1214. In response to a script file associated with the service request or target request template being found, sending the script file associated with the service request or target request template to the client.

In step 1213, informing the client that no script file is found may be done by sending a message, such as, the message of "No corresponding script file" or "No related service item," which is displayed in the assist application interface at the client. At this time the user can initiate the recording mode through the recording control keys provided in the interface. Once the recording mode starts, the client would monitor the real-time operation of the user: and upload each operation monitored to the server. The client may also record a sequence of the user's operation/display events, and upload the recorded sequence of operations to the server.

Figure 13:
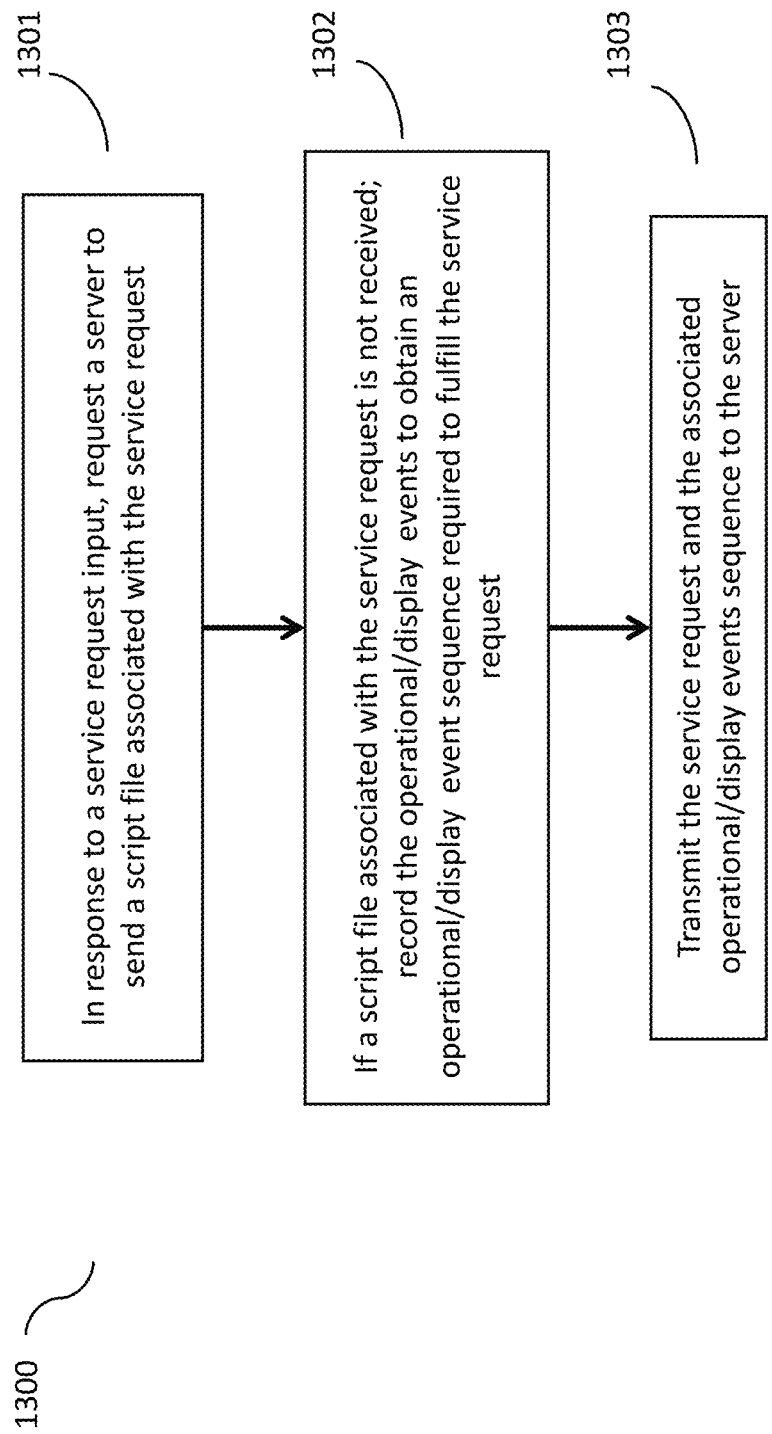
FIG. 13 is a flowchart illustrating a method for processing service requests according to certain embodiments.

FIG. 13 is a flowchart illustrating a method 1300 of processing a service request at the client side according to certain embodiments. As shown in FIG. 13, the method comprises:

1301. Responding to a service request input via the assist application (i.e., the AP), requesting a server to send a script file associated with the service request.

1302. If a script file associated with the service request is not received from the server, recording the operation/display events in the service application in response to a recording instruction triggered in the assist application to obtain an operational event sequence used to fulfill the service request.

1303. Transmitting the service request and the associating operational event sequence to the server.

As discussed above, the server generates the script file according to the operation/display event sequence after receiving the service request and the operation/display event sequence to be associated, and then stores the script file in association with the service request. If the service request is generalized into a request template, the request template can be associated with the script file and stored. In this case, the server would semantically analyze the service request when receiving the service request from the client; then find the target request template whose similarity is greater than the preset threshold; and send script file associated with the request template to the client. If the script file is not found, the server would send a "not found" to the client as the feedback message. If the script file is found, the client would execute the script file associated with that request template. It should be noted that, when the script file associated with the service request is acquired, the variable information should be extracted from the service request, and then used as the input information for the script file to complete the execution of the script file.

For example, a request template associated with a first script file is "send red packet to  with ". When the service request from the client is "send red packets to Tom with $20", the method would extract the variables "Tom" and "$20" from the service request. These variables would be used as the input information for the first script file. The extracted variables would be used to complete the request of sending a gift card to a particular person with a particular amount.

It is to be noted that each of the above-described method embodiments is described as a series of action combinations for the sake of brevity. But the present application is not limited by the described sequence of actions. Certain steps may be performed in other sequences or simultaneously in accordance with the present application. In addition, the embodiments described in this specification are just the preferred embodiment, and the actions and modules involved are not necessarily essential to the application.

Figure 14:
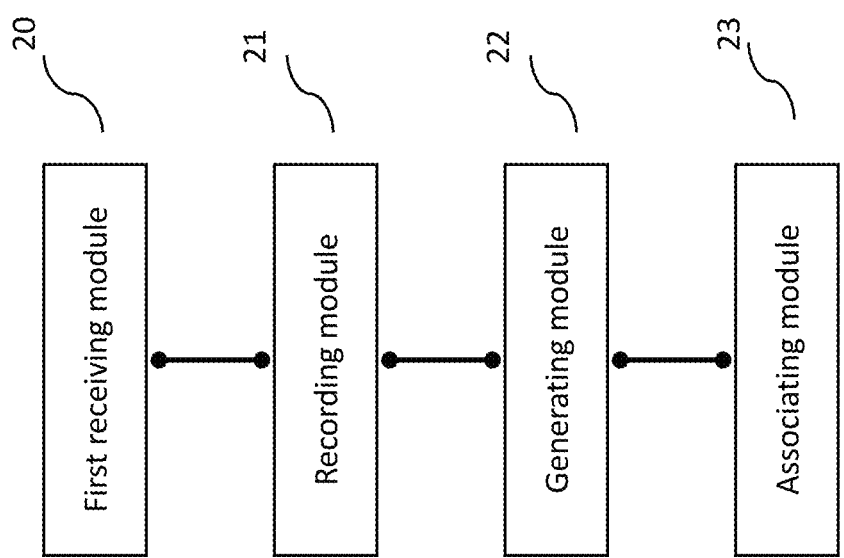
FIG. 14 is a block diagram illustrating the configuration of an apparatus for processing service requests according to certain embodiments.

FIG. 14 is a block diagram illustrating an apparatus for processing a service request according to certain embodiments. As shown in FIG. 14, the apparatus includes a first receiving module 20 for receiving a service request. It also includes a recording module 21 for recording the operation/display events when a user operates the service application to obtain the service. The recording module 21 would document an operational event sequence which is required to fulfill the service request. The apparatus also includes a generation module 22 for generating a script file according to the operational event sequence; and an association module 23 for associating the service requests with the script file.

In certain embodiments, the operation/display events of one or more service applications are recorded to obtain an operational event sequence required to fulfill the service request. A script file based on the sequence of operational event is generated, and associated with the service request. When the user needs to carry out the same service request again, the apparatus can retrieve script file and execute it to fulfill user's service request without repeated operation from the user.

Further, the above-described apparatus may include a starting module. Wherein the starting module is operable to initiate a recording mode if there is no local script file associated with the service request; or if a script file associated with the service request is not obtained from the server; or in response to a recording instruction triggered by the assist application (i.e., the AP). The starting module activating the recording mode so a new script file can be obtained after the recording.

Further, the above-described apparatus may also include a second receiving module for retrieving a script file associated with the service request, in response to a service request input through an assist application. It may also include a first execution module for executing the script file obtained by the second receiving module.

Further, the apparatus may also comprise a third receiving module for obtaining a page element corresponding to the script file; and a presentation module for presenting the page element in an interface of the assist application (i.e., the AP).

Further, the association module in the above-described apparatus includes a creation unit for creating a request template according to the service request, and an association unit for associating the request template with the script file.

Further, the creating unit in the above-described apparatus is also configured to semantically analyze the service request to obtain a semantic backbone, and to use the semantic backbone as the request template.

Further, the above-described apparatus also comprises of an analysis module which, in response to a service request input by the assist application, performs a similarity analysis of the service request with a variety of request templates to determine a target request template, which has a similarity to the service request with a value greater than a preset threshold. The apparatus may also include a request module for retrieving a script file associated with the target request template; an extraction module for extracting variable information from the service request; and a second execution module for executing the script file using the variable information as input information for the script file.

Further, in the above-described apparatus, the second execution module is further configured to search for the variable information in the service application if the variable information is search information. If the variable information is present in the search result, the information associated with the content of the variable information is executed as the input information of the script file. If there is no information associated with the contents of the variable information in the search result, then the module acquires the information at the specified location as the input information for the script file, and executing that script file.

Further, in the above-described apparatus, the receiving module is further configured to: obtaining a service request voice input through the assist application (i.e., the AP); and/or obtaining the service request text input through the assist application; and/or obtaining the service request option selected through the assist application interface.

Figure 15:
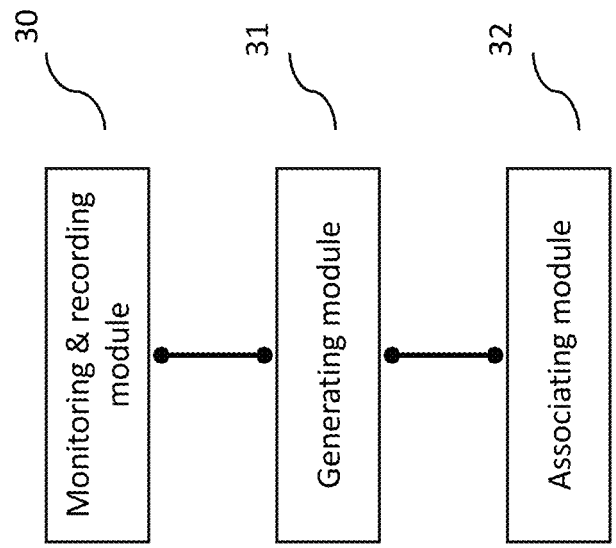
FIG. 15 is a block diagram illustrating the configuration of an apparatus for processing service requests according to certain embodiments.

FIG. 15 is a block diagram illustrating the structure of an apparatus for processing a service request according to certain embodiments. As shown in FIG. 15, the apparatus includes a monitoring & recording module 30 for listening to the operation/display events of the client according to a recording request sent by the client, and recording the monitored operation/display events to obtain a operational event sequence for fulfilling the service request. The apparatus also includes a generating module 31 for generating a script file according to the operational event sequence, and an associating module 32 for associating the script file with the service request.

Further, the associating module in the apparatus comprises a creating unit for creating a request template according to the service request, and an associating unit for associating the request template with the script file.

Further, the creating unit in the above apparatus is further configured to semantically analyze the service request to obtain a semantic backbone, and to use the semantic backbone as the request template.

The above apparatus further comprises of: a receiving module for receiving a service request sent by the client; a determining module for performing a similarity analysis of the service request with a variety of requests templates to determine a target request template that is similar to the service request; and a sending module to send a script file associated with the target request template to the client.

Further, the apparatus further comprises a feedback module for providing feedback information to the client if it is determined that there is no target request template having a similarity to the service request with a value greater than a preset threshold.

Figure 16:
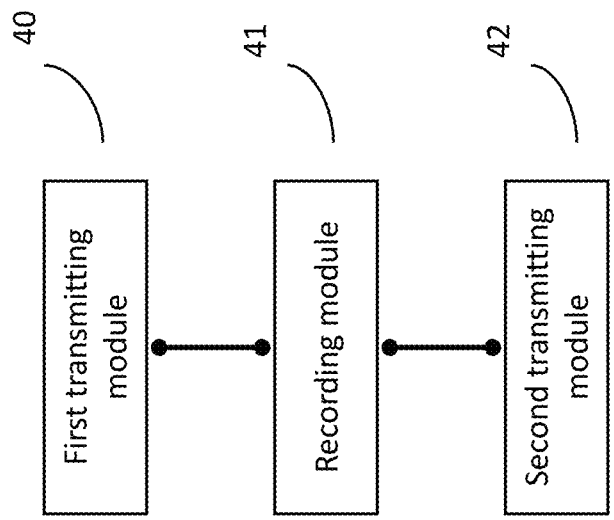
FIG. 16 is a block diagram illustrating a configuration of an apparatus for processing service requests according to certain embodiments.

FIG. 16 is a block diagram illustrating the structure of an apparatus for processing a service request according to certain embodiments. As shown in FIG. 16, the apparatus includes a first transmitting module 40 for requesting a server for a script file associated with the service request, in response to a service request input through the assist application (i.e., the AP). The apparatus also includes a recording module 41 to document the operation/display events of the service application, in response to a recording instruction triggered by the assist application when no associated script file was found. The recording module 41 obtains a sequence of operational event that is necessary to fulfill the service request. The apparatus also includes a second transmitting module 42 to send the service request and the operational event sequence to be associated, to the server.

The device of this embodiment is located on the client side and interact with the server to send the service request and the operational event sequence to the server. The server generates the script file according to the operational event sequence and associates the service request with the script file. When the user requests the same service request again, the script file associated with the service request can be obtained directly from the server, no repeated operation is necessary from the user.

Further, the apparatus may also include an extraction module for extracting the variable information from the service request if a script file associated with the service request is acquired; an execution module for storing the variable information as input for the script file, and executing the script file.

Further, the apparatus may also include an execution module to search for the variable information in the service application if the variable information is a search information. If there is information associated with the content of the variable information in the search result, this module executing the script file with that associated information as the input. If the information associated with the content of the variable information is not present in the search result, the execution model then acquires the information at a specific location of the search result as the input information for the script file, and executes that script file.

The embodiments of the present application may be provided as a method, system, or computer program. Thus, the present application may take the form of a full hardware embodiment, a full software embodiment, or an embodiment combining software and hardware aspects. Moreover, the application may take the form of a computer program implemented on one or more computer or storage media that has programming code, including but not limited to disk storage, CD-ROM, optical storage, etc.

Embodiments of the present application are described with reference to flowcharts and/or block diagrams. It is to be understood that each process and/or block in the flowcharts or in the block diagrams, as well as combinations of flow and/or blocks in the flowcharts and/or block diagrams, may be implemented by computer program instructions. These computer program instructions may be provided to a processor of a general purpose computer, a special purpose computer, an embedded processor, or other programmable data processing device to produce a machine. The machine then implements the functions specified in the block or blocks of a flowchart or a block diagrams, using the instructions generated by a processor of a computer or other programmable data processing device. Moreover, the applications may take the form of a computer program product implemented on one or more computer usable storage media (including but not limited to disk storage, Flash memory, CD-ROM, optical storage, etc.) which containing computer usable program code.

The computer program instructions may also be stored in a computer readable memory, which is capable of directing a computer or other programmable apparatus for processing a service request to operate in a particular manner, such that the instructions stored in the memory can produce an article of product comprising of instruction devices. These instruction devices implement one or multiple functions specified in a flowchart or a block diagrams.

These computer program instructions may also be installed onto a computer or other programmable data processing device, so that a series of operational steps are performed on a computer or other programmable device to produce computer-implemented process for executing the instructions steps to implement the functions specified in a block or blocks of a flowchart and/or block diagrams, on a computer or other programmable device.

The above descriptions are only examples of the present application and is not intended to limit the present application. The application is susceptible to various modifications and changes by those skilled in the art. Any modifications, equivalents, improvements and the like which fall within the spirit and principle of the application, and are intended to be embraced within the scope of the appended claims.

I claim:

1. A method performed by a computer system in communication with a mobile device via a packet-based network, the method comprising:
   receiving from the packet-based network information about a first service request and a sequence of operation/display events performed on the mobile device to fulfill the first service request;
   extracting a request template from the first service request;
   building a script file associated with the request template based on the sequence of operation/display events;
   storing the script file and the associated request template in a data store;
   receiving a second service request from the mobile device via the packet based network;
   in response to the second service request being similar to the request template, extracting variable information from the second service request and retrieving the script file associated with the request template from the data store;
   transmitting the script file together with the request template and the variable information to the mobile device via the packet-based network.

2. The method of claim 1, wherein the sequence of operation/display events include a series of user actions and program displays on the mobile device and wherein the script file is executable by the mobile device to automatically fulfill the second service request without any user action on the mobile device.

3. The method of claim 2, wherein the displays include a window for receiving a search query and the actions include an entry of a search query.

4. The method of claim 2, wherein the mobile device includes an input touch panel and the actions include one or more touches and one or more swipes on the input touch panel.

5. The method of claim 1, wherein the first service request includes a text string, and wherein extracting a request template comprises parsing the text string into a general portion and a specific portion and replacing the specific portion with a variable.

6. The method of claim 1, wherein the first service request includes a text string, and wherein extracting a request template comprises associating the service request with a category of service requests that covers similar service requests expressed with different text strings.

7. The method of claim 1, further comprising performing a similarity analysis of the second service request with a variety of request templates to determine a target request template having a similarity to the second service request with a similarity value greater than a preset threshold.

8. The method of claim 1, wherein the variable information is input information for the script file, and wherein extracting the variable information from the second service request comprises parsing the second service request into a general portion and a specific portion and using the specific portion as the variable information.

9. A method performed by a mobile device in communication with a server over a packet-based network, the method comprising:
   receiving a service request in the form of a user input;
   transmitting the service request to the server via the packet-based network;
   in response to receiving a script file associated with the service request from the server via the packet-based network, executing the script file to bring about a first sequence of operation/display events to fulfill the service request;
   in response to a feedback from the server via the packet-based network that no script file associated with the service request is found, requesting a user permission to enter the recording mode;
   in response to the user instruction to enter the recording mode, obtaining a second sequence of operation/display events used to fulfill the service request and transmitting the second sequence of operation/display events together with the service request to the server via the packet-based network.

10. The method of claim 9, wherein the service request includes a text string and the user input being one of a text input, a voice input and a selection of an icon or a link.

11. The method of claim 9, wherein the script file includes the first sequence of operation/display events.

12. The method of claim 11, wherein the first sequence of operation/display events include a series of actions and displays on the mobile device, and wherein the actions include an entry of a search query.

13. The method of claim 11, wherein the first sequence of operation/display events include a series of actions and displays on the mobile device, and wherein the actions include one or more touches and one or more swipes on an input touch panel of the mobile device, wherein the actions are performed automatically without actual user input.

14. The method of claim 9, wherein the second sequence of operation/display events comprises operation/display events associated with a service application program, and wherein obtaining the second sequence of operation/display events comprises providing a transparent display that overlays displays of the service application program so as to capture user inputs on the service application program.

15. A non-transitory computer-readable storage medium storing one or more programs for execution by one or more processors of a mobile device, the one or more programs including instructions for:
   receiving a service request in the form of a user input;
   transmitting the service request to a server via the packet-based network;
   in response to receiving a script file associated with the service request from the server via the packet-based network, executing the script file to bring about a first sequence of operation/display events to fulfill the service request;
   in response to a feedback from the server via the packet-based network that no script file associated with the service request is found, requesting a user permission to enter the recording mode;
   capturing the user inputs and the program displays on an input/output module of the mobile device as a user of the mobile device navigates at least one service application to fulfill a service request;

recording the user inputs and the program displays to obtain a second sequence of user inputs and program displays;

generating a script file including the second sequence of user inputs and program displays; and transmitting the second sequence of operation/display events together with the service request to the server via the packet-based network.

16. The non-transitory computer-readable storage medium of claim 15, wherein the non-transitory computer-readable storage medium includes storage memory, the storage memory including a normal storage for storing program codes and data that can be modified by the user and an internal or read-only memory (ROM) storage storing an operating system and core function applications that cannot be easily modified by the user, and wherein at least part of the program codes are stored in the ROM.

17. The non-transitory computer-readable storage medium of claim 16, wherein the user inputs in the sequence of user inputs and program displays include an entry of a search query.

18. The non-transitory computer-readable storage medium of claim 15, wherein the user inputs in the sequence of user inputs and program displays include one or more touches and one or more swipes on a input touch panel of the mobile device.

19. The non-transitory computer-readable storage medium of claim 16, wherein when the at least part of the program codes are called by the one or more processors to execute the script file, the one or more processes causes the mobile device to automatically navigate through program displays to fulfill the service request.

20. The non-transitory computer-readable storage medium of claim 15, wherein when the at least part of the program codes are called by the one or more processors to execute the script file, the one or more processors causes the mobile device to simulate the user inputs included in the script file and to display corresponding program displays specified by the script file.

* * * * *

UNITED STATES PATENT AND TRADEMARK OFFICE
CERTIFICATE OF CORRECTION

PATENT NO. : 10,372,512 B2
APPLICATION NO. : 15/397728
DATED : August 6, 2019
INVENTOR(S) : Wu It is certified that error appears in the above-identified patent and that said Letters Patent is hereby corrected as shown below:

On the Title Page

Item (57) ABSTRACT, Line 1, please delete "application provides" and insert --application provide--;

In the Claims

Claim 1, Column 21, Line 29, please delete "the packet based" and insert --the packet-based--;

Claim 1, Column 21, Line 34, please delete "store;" and insert --store; and--;

Claim 2, Column 21, Line 39, please delete "events include a" and insert --events includes a--;

Claim 9, Column 22, Line 19, please delete "enter the recording mode" and insert --enter a recording mode--;

Claim 12, Column 22, Line 32, please delete "events include" and insert --events includes--;

Claim 13, Column 22, Line 36, please delete "events include a" and insert --events includes a--;

Claim 15, Column 22, Lines 53-54, please delete "via the packet-based" and insert --via a packet-based--;

Claim 15, Column 22, Line 63, please delete "enter the recording" and insert --enter a recording--;

Claim 18, Column 24, Line 4, please delete "on a input" and insert --on an input--;

Claim 19, Column 24, Line 8, please delete "more processes causes the" and insert --more processors cause the--;

Signed and Sealed this
Twenty-ninth Day of October, 2019

Andrei Iancu
*Director of the United States Patent and Trademark Office*

Claim 20, Column 24, Line 13, please delete "processors causes the" and insert --processors cause the--.